(12) United States Patent
Rosenflanz et al.

(10) Patent No.: US 7,501,000 B2
(45) Date of Patent: *Mar. 10, 2009

(54) ABRASIVE PARTICLES, ABRASIVE ARTICLES, AND METHODS OF MAKING AND USING THE SAME

(75) Inventors: Anatoly Z. Rosenflanz, Maplewood, MN (US); Ahmet Celikkaya, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1032 days.

This patent is subject to a terminal disclaimer.

(21) Appl. No.: 10/211,598

(22) Filed: Aug. 2, 2002

(65) Prior Publication Data

US 2003/0115805 A1    Jun. 26, 2003

Related U.S. Application Data

(63) Continuation-in-part of application No. 09/922,526, filed on Aug. 2, 2001, now abandoned, and a continuation-in-part of application No. 09/922,527, filed on Aug. 2, 2001, now abandoned, and a continuation-in-part of application No. 09/922,528, filed on Aug. 2, 2001, now abandoned, and a continuation-in-part of application No. 09/922,530, filed on Aug. 2, 2001, now abandoned.

(51) Int. Cl.
*C01F 7/04* (2006.01)
*C09C 1/68* (2006.01)

(52) U.S. Cl. ............... 51/309; 428/325; 501/153
(58) Field of Classification Search ............ 51/309; 501/153; 428/325
See application file for complete search history.

(56) References Cited

U.S. PATENT DOCUMENTS

| | | |
|---|---|---|
| 659,926 A | 10/1900 | Jacobs |
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |

(Continued)

FOREIGN PATENT DOCUMENTS

AT    333146    10/1976

(Continued)

OTHER PUBLICATIONS

Aasland and McMillan, Nature 369, 633 (1994).

(Continued)

*Primary Examiner*—A. A. Turner
(74) *Attorney, Agent, or Firm*—Gregory D. Allen

(57) ABSTRACT

Abrasive particles comprising alpha alumina particles and methods of making the same. The abrasive particles can be incorporated into a variety of abrasive articles, including bonded abrasives, coated abrasives, nonwoven abrasives, and abrasive brushes.

26 Claims, 6 Drawing Sheets

U.S. PATENT DOCUMENTS

| | | |
|---|---|---|
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Comstock, III |
| 2,805,166 A | 9/1957 | Loffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |
| 3,377,660 A | 4/1968 | Marshall et al. |
| 3,498,769 A | 3/1970 | Coes, Jr. |
| 3,519,448 A | 7/1970 | Alper et al. |
| 3,625,717 A | 12/1971 | Grubba et al. |
| 3,635,739 A | 1/1972 | Macdowell et al. |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Piseslinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| 4,366,253 A | 12/1982 | Yagi |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Wood et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhof-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,045,402 A | 9/1991 | Adams, Jr. et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,104,319 A | 4/1992 | Evans et al. |
| 5,104,830 A | 4/1992 | Drouet et al. |
| 5,108,477 A | 4/1992 | Cornelius et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |

| | | | | | | |
|---|---|---|---|---|---|---|
| 5,248,318 | A | 9/1993 | Tamamaki et al. | 6,054,093 | A | 4/2000 | Torre, Jr. et al. |
| 5,259,147 | A | 11/1993 | Falz et al. | 6,123,743 | A | 9/2000 | Carman et al. |
| 5,273,566 | A | 12/1993 | Balcar et al. | 6,128,430 | A | 10/2000 | Chu et al. |
| 5,282,875 | A | 2/1994 | Wood et al. | 6,146,244 | A | 11/2000 | Atsugi et al. |
| 5,312,789 | A | 5/1994 | Wood | 6,214,429 | B1 | 4/2001 | Zou et al. |
| 5,336,280 | A | 8/1994 | Dubots et al. | 6,245,700 | B1 | 6/2001 | Budd et al. |
| 5,348,914 | A | 9/1994 | Thometzek et al. | 6,251,813 | B1 | 6/2001 | Sato |
| 5,352,254 | A | 10/1994 | Celikkaya | 6,254,981 | B1 | 7/2001 | Castle |
| 5,366,523 | A | 11/1994 | Rowenhorst et al. | 6,268,303 | B1 | 7/2001 | Aitken et al. |
| 5,372,620 | A | 12/1994 | Rowse et al. | 6,277,161 | B1 * | 8/2001 | Castro et al. .................. 51/309 |
| 5,376,470 | A | 12/1994 | Sprouse | 6,287,353 | B1 | 9/2001 | Celikkaya |
| 5,378,251 | A | 1/1995 | Culler et al. | 6,306,926 | B1 | 10/2001 | Bretscher et al. |
| 5,378,662 | A | 1/1995 | Tsuyuki | 6,329,309 | B1 | 12/2001 | Kanamaru et al. |
| 5,395,407 | A | 3/1995 | Cottringer et al. | 6,335,083 | B1 | 1/2002 | Kasai et al. |
| 5,413,974 | A | 5/1995 | Yokoyama et al. | 6,355,586 | B1 | 3/2002 | Usui et al. |
| 5,417,726 | A | 5/1995 | Stout et al. | 6,361,414 | B1 | 3/2002 | Ravkin et al. |
| 5,427,595 | A | 6/1995 | Pihl et al. | 6,362,119 | B1 | 3/2002 | Chiba |
| 5,429,647 | A | 7/1995 | Larmie | 6,395,368 | B1 | 5/2002 | Yamaguchi et al. |
| 5,431,704 | A | 7/1995 | Tamamaki et al. | 6,447,937 | B1 | 9/2002 | Murakawa et al. |
| 5,436,063 | A | 7/1995 | Follett et al. | 6,451,077 | B1 | 9/2002 | Rosenflanz |
| 5,443,906 | A | 8/1995 | Pihl et al. | 6,454,822 | B1 | 9/2002 | Rosenflanz |
| 5,449,389 | A | 9/1995 | Yoshizumi et al. | 6,458,731 | B1 | 10/2002 | Rosenflanz |
| 5,484,752 | A | 1/1996 | Waku et al. | 6,461,988 | B2 | 10/2002 | Budd et al. |
| 5,496,386 | A | 3/1996 | Broberg et al. | 6,469,825 | B1 | 10/2002 | Digonnet et al. |
| 5,498,269 | A * | 3/1996 | Larmie ........................ 51/295 | 6,482,758 | B1 | 11/2002 | Weber et al. |
| 5,516,348 | A * | 5/1996 | Conwell et al. ............... 51/309 | 6,482,761 | B1 | 11/2002 | Watanabe et al. |
| 5,520,711 | A | 5/1996 | Helmin | 6,484,539 | B1 | 11/2002 | Nordine et al. |
| 5,534,843 | A | 7/1996 | Tsunoda et al. | 6,490,081 | B1 | 12/2002 | Feillens et al. |
| 5,547,479 | A * | 8/1996 | Conwell et al. ............. 501/153 | 6,511,739 | B2 | 1/2003 | Kasai et al. |
| 5,549,962 | A | 8/1996 | Holmes et al. | 6,514,892 | B1 | 2/2003 | Kasai et al. |
| 5,551,963 | A * | 9/1996 | Larmie ........................ 51/307 | 6,521,004 | B1 | 2/2003 | Culler et al. |
| 5,552,213 | A | 9/1996 | Eschner | 6,592,640 | B1 * | 7/2003 | Rosenflanz et al. ........... 51/309 |
| 5,569,547 | A | 10/1996 | Waku et al. | 6,596,041 | B2 * | 7/2003 | Rosenflanz ................. 501/153 |
| 5,593,467 | A | 1/1997 | Monroe | 6,607,570 | B1 * | 8/2003 | Rosenflanz et al. ......... 501/153 |
| 5,605,870 | A | 2/1997 | Strom-Olsen et al. | 6,620,214 | B2 | 9/2003 | McArdle et al. |
| 5,609,706 | A | 3/1997 | Benedict et al. | 6,666,750 | B1 * | 12/2003 | Rosenflanz ................. 51/309 |
| 5,611,829 | A * | 3/1997 | Monroe et al. ................ 51/309 | 6,669,749 | B1 * | 12/2003 | Rosenflanz et al. ......... 501/153 |
| 5,641,469 | A | 6/1997 | Garg et al. | 6,706,083 | B1 * | 3/2004 | Rosenflanz ................. 51/309 |
| 5,643,840 | A | 7/1997 | Hikata et al. | 6,749,653 | B2 * | 6/2004 | Castro et al. ................. 51/309 |
| 5,645,619 | A | 7/1997 | Erickson et al. | 6,818,578 | B2 | 11/2004 | Tachiwama |
| 5,648,302 | A | 7/1997 | Brow et al. | 6,833,014 | B2 | 12/2004 | Welygan et al. |
| 5,651,925 | A | 7/1997 | Ashley et al. | 6,878,456 | B2 | 4/2005 | Castro et al. |
| 5,653,775 | A | 8/1997 | Plovnick et al. | 6,984,261 | B2 | 1/2006 | Cummings et al. |
| 5,665,127 | A | 9/1997 | Moltgen et al. | 2001/0030811 | A1 | 10/2001 | Kasai et al. |
| 5,679,067 | A | 10/1997 | Johnson et al. | 2002/0066233 | A1 | 6/2002 | McArdle et al. |
| 5,682,082 | A | 10/1997 | Wei et al. | 2002/0160694 | A1 | 10/2002 | Wood et al. |
| 5,689,374 | A | 11/1997 | Xu et al. | 2003/0040423 | A1 | 2/2003 | Harada et al. |
| 5,693,239 | A | 12/1997 | Wang et al. | 2004/0148868 | A1 | 8/2004 | Anderson et al. |
| 5,721,188 | A | 2/1998 | Sung et al. | | | | |
| 5,725,162 | A | 3/1998 | Garg et al. | | | | |
| 5,733,178 | A | 3/1998 | Obishi | | | | |
| 5,733,564 | A | 3/1998 | Lehtinen | | | | |
| 5,738,696 | A | 4/1998 | Wu | | | | |
| 5,747,397 | A | 5/1998 | McPherson et al. | | | | |
| 5,763,345 | A | 6/1998 | Ohshima et al. | | | | |
| 5,782,940 | A | 7/1998 | Jayan et al. | | | | |
| 5,804,513 | A | 9/1998 | Sakatani et al. | | | | |
| 5,827,791 | A | 10/1998 | Pauliny et al. | | | | |
| 5,847,865 | A | 12/1998 | Gopinath et al. | | | | |
| 5,856,254 | A | 1/1999 | Feige et al. | | | | |
| 5,863,308 | A | 1/1999 | Qi et al. | | | | |
| 5,876,470 | A | 3/1999 | Abrahamson | | | | |
| 5,902,763 | A | 5/1999 | Waku et al. | | | | |
| 5,903,951 | A | 5/1999 | Ionta et al. | | | | |
| 5,916,496 | A | 6/1999 | Hoffman et al. | | | | |
| 5,952,256 | A | 9/1999 | Morishita et al. | | | | |
| 5,954,844 | A | 9/1999 | Law et al. | | | | |
| 5,961,674 | A | 10/1999 | Gagliardi et al. | | | | |
| 5,975,988 | A | 11/1999 | Christianson | | | | |
| 5,976,274 | A | 11/1999 | Inoue et al. | | | | |
| 5,981,413 | A | 11/1999 | Hale | | | | |
| 5,981,415 | A | 11/1999 | Waku et al. | | | | |
| 6,053,956 | A * | 4/2000 | Wood ........................ 51/309 | | | | |

FOREIGN PATENT DOCUMENTS

| | | |
|---|---|---|
| DE | 20 34 011 | 7/1970 |
| DE | 134 638 A | 3/1979 |
| DE | 141 420 | 4/1980 |
| DE | 3534575 | 4/1986 |
| EP | 0 200 487 | 11/1986 |
| EP | 0 227 374 | 7/1987 |
| EP | 0 236 507 | 9/1987 |
| EP | 0 291 029 A1 | 11/1988 |
| EP | 0 408 771 A1 | 1/1991 |
| EP | 0 469 271 | 2/1992 |
| EP | 0 480 678 A1 | 4/1992 |
| EP | 0 494 638 | 7/1992 |
| EP | 0 495 536 A2 | 7/1992 |
| EP | 0 579 281 A1 | 1/1994 |
| EP | 0 601 453 A2 | 6/1994 |
| EP | 0 647 601 A1 | 4/1995 |
| EP | 0 666 238 B1 | 8/1995 |
| EP | 0 666 239 B1 | 8/1995 |
| EP | 0 709 347 | 5/1996 |
| EP | 0 722 919 A1 | 7/1996 |
| EP | 0 291 029 B2 | 11/1996 |
| FR | 1547989 | 10/1968 |

| | | |
|---|---|---|
| FR | 2 118 026 | 7/1972 |
| FR | 2538370 | 6/1984 |
| FR | 2 609 708 | 7/1988 |
| GB | 793503 | 4/1958 |
| GB | 1005338 | 9/1965 |
| GB | 1 121 875 | 7/1968 |
| GB | 1 260 933 A | 1/1972 |
| GB | 1 411 398 | 10/1975 |
| GB | 2 116 992 | 10/1983 |
| JP | 50025608 | 3/1975 |
| JP | 59 22 7726 A | 12/1984 |
| JP | 60221338 | 11/1985 |
| JP | 61099665 | 5/1986 |
| JP | 62-003041 | 1/1987 |
| JP | 63-156024 | 6/1988 |
| JP | 63-225548 | 9/1988 |
| JP | 02608648 | 9/1988 |
| JP | 63-303821 | 12/1988 |
| JP | 2-92835 | 4/1990 |
| JP | 03-113428 | 5/1991 |
| JP | HEI 4-119941 | 4/1992 |
| JP | 05-085821 | 4/1993 |
| JP | 05-226733 | 9/1993 |
| JP | 06 040765 A | 2/1994 |
| JP | 06-171974 | 6/1994 |
| JP | HEI 11-189926 | 7/1999 |
| JP | 11-335136 | 12/1999 |
| JP | 10-208229 | 2/2000 |
| JP | 10-208244 | 2/2000 |
| JP | 200045128 A | 2/2000 |
| JP | 200045129 A | 2/2000 |
| JP | 2000-119042 | 4/2000 |
| JP | 201294480 | 10/2001 |
| KR | 9601009 B1 | 1/1996 |
| RU | 2002771 | 11/1993 |
| RU | 2148569 | 5/2000 |
| RU | 2148569 | 10/2000 |
| SU | 1217809 | 3/1986 |
| SU | 1455569 | 10/1986 |
| SU | 1768561 | 10/1992 |
| SU | 1455569 | 10/1996 |
| WO | WO 93/21120 | 10/1993 |
| WO | WO94/14722 | 7/1994 |
| WO | WO97/16385 | 5/1997 |
| WO | WO97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |

OTHER PUBLICATIONS

Aguilar et al, "Melt Extraction Processing of Structural $Y_2O_3$-$Al_2O_3$ Fibers", J. Eur. Ceram. Soc. 20 1091-1098 (2000).
Gandhi, A.S. and Jarayam, V., "Pressure Consolidation of Amorphous $ZrO_2$-$Al_2O_3$ by Plastic Deformation of Powder Particles", Acta Materiala, 50 (2002), 2137-2149.
Gonzalez, Eduardo J., et al., "High Pressure Compaction and Sintering of Nano-Size γ-$Al_2O_3$ Powder", Materials and Manufacturing Processes vol. 11, No. 6, 951-967, 1996.
Jantzen, C.M., Krepski, R.P., & Herman, H., "Ultra-Rapid Quenching of Laser-Method Binary and Unary Oxides", Mat. Res. Bull. 15, 1313-1326 (1980).
Khor K.A., "Novel ZrO2-Mullite Composites Produced By Plasma Spraying", Proceedings of the 15th International Thermal Pray Conference, May 25-29, 1998, Nice, France.
Ray, C.S. and Day, D.E., "Determining the Nucleation Rate Curve for Lithium Disilicate Glass by Differential Thermal Analysis", J. Am. Ceram. Soc. 73(2) 439-442 (1990).
Schmucker, M, et al., "Constitution of Mullite Glasses Produced by Ultra-Rapid Quenching of Plasma-Sprayed Melts", Journal of the European Ceramic Society 15 (1995) 1201-1205.
Sarjeant, P.T, & Roy, R., in Reactivity of Solids (ed. J. W. Mitchell, R.C., DeVries, R.W., Roberts and P. Cannon) 725-33 (John Wiley.& Sons, Inc., New York 1969).
Takamori, T., & Roy, R., "Rapid Crystallization of SiO2-Al2O3 Glasses", Journal of American Society, vol. 56, No. 12, Dec. 1973.
Weber et al., "Synthesis and Optical Properties of Rare-Earth-Aluminum Oxide Glasses", J. Am. Ceram. Soc. 85(5) 1309-1311 (2002).
Wilding, M.C., McMillan, P.F., "Polyamorphic Transitions in Yttria-Alumina Liquids", J. Non-Cryst. Solids. 293-295, 357-365 (2001).
U.S. Application entitled "Ceramic Aggregate Particles", filed Feb. 11, 2004, having U.S. Appl. No. 10/776,156.
U.S. Application entitled "Methods of Making Ceramic Particles", filed Sep. 5, 2003, having U.S. Appl. No. 10/655,729.
U.S. Application entitled "Methods of Making Ceramics Comprising $Al_2O_3$, REO, $ZrO_2$ and/or $HfO_2$, and $Nb_2O_5$ and/or $Ta_2O_5$", filed Sep. 18, 2003, having U.S. Appl. No. 10/666,615.
U.S. Application entitled "Ceramics Comprising $Al_2O_3$, REO, $ZrO_2$ and/or $HfO_2$, and $Nb_2O_5$ and/or $Ta_2O_5$, and Methods of Making The Same", filed Sep. 18, 2003, having U.S. Appl. No. 10/666,212.
U.S. Application entitled "Ceramics Comprising $Al_2O_3$, $Y_2O_3$, $ZrO_2$ and/or $HfO_2$, and $Nb_2O_5$ and/or $Ta_2O_5$, and Methods of Making The Same", filed Sep. 18, 2003, having U.S. Appl. No. 10/666,098.
U.S. Application entitled "Alumina-Yttria Particles and Methods of Making The Same", filed Dec. 18, 2003, having U.S. Appl. No. 10/740,262.
U.S. Application entitled "Method of Making Abrasive Particles", filed Dec 18, 2003, having U.S. Appl. No. 10/739,420.
U.S. Application entitled "Transparent Fused Crystalline Ceramics, And Method of Making The Same", filed Dec 18, 2003, having U.S. Appl. No. 10/739,439.
U.S. Application entitled "Method of Making Abrasive Particles", filed Dec 18, 2003, having U.S. Appl. No. 10/739,440.
U.S. Application entitled "Method of Making Abrasive Particles", filed Dec. 18, 2003, having U.S. Appl. No. 10/740,096.
U.S. Application entitled "Method of Making Abrasive Particles", filed Dec. 18, 2003, having U.S. Appl. No. 10/739,44.
U.S. Application entitled "Powder Feeding Method and Apparatus", filed Dec. 18, 2003, having U.S. Appl. No. 10/739,233.
U.S. Application entitled "Use of Ceramics In Dental And Orthodontic Applications", filed Feb. 5, 2003, having U.S. Appl. No. 10/358,856.
U.S. Application entitled "Use of Glasses Containing Rare Earth Oxide, Alumina, and Zirconia And Dopant In Optical Waveguides", filed Apr. 28, 2003, having U.S. Appl. No. 10/425,039.
Imakoa, Minoru et al., "Refractive Index and Abbe's Number of Glass of Lanthanum Borate System", Journal Ceramic Assoc. Japan, vol. 70, No. 5, (1962), pp. 115.
Kingery, W.D., Introduction to Ceramics, Second Edition, Chpt. III subchapter 8.8, Glass-Ceramic Materials, pp. 368-374, (1976).
Kokubo, Tadashi et al., "Infrared Transmission of ($R_2O$ or R'O)-($TiO_2$, $Nb_2O_5$ or $Ta_2O_5$ )-$Al_2O_3$ Glasses", Journal of Non-Crystalline Solids 22 (1970) 125-134.
Affidavit Under §1.132 for Anatoly Rosenflanz.
McMillan, P.W., Glass-Ceramics, Academic Press, Inc., 2nd Edition (1979)**.
Stookey. S. D., Ceramics Made by Nucleation of Glass-Comparison of Microstructure and Properties with Sintered Ceramics, The American Ceramic Society, (1992), pp. 1-4.
Varshneya, Arun K., "Fundamentsal of Inorganic Glasses", pp. 425-427 (1994).
"Rare Earth Oxide-Aluminum Oxide Glasses for Mid-Range IR Devices," Weber et al., reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).
Device Materials Based on Er-, Ho-, Tm-, and Yb-Doped Rare Earth Aluminum Oxide (REAl™) Glass, Weber et al., reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).

Kondrashov V I et al., "Opacified Glass "Decorit" Synthesis Directions", Steklo I Keramika 2001, No. 1, pp. 8-11.

"$Gd_3Al_5O_{12}$ Phase Obtained by Crystallization of Amorphous $Gd_2O_3$ ⅗ $Al_2O_3$," Shishido et al., *Journal of the American Ceramic Society*, vol. 61, No. 7-8, Jul.-Aug. 1978, pp. 373-374.

"Rapid Quenching on the Binary Systems of High Temperature Oxides," Suzuki et al., *Mat. Res. Bull.*, vol. 9, 1974, pp. 745-754.

"Unusual Glass Formation in the Al-Nd-O System," Yajima et al., Chemistry Letters (published by the Chemical Society of Japan), 1973, pp. 741-742.

Glass Formation in the Ln-Al-O System, (Ln: Lanthanoid and Yttrium Elements), Yajima et al., Chemistry Letters, 1973, pp. 1327-1330.

"Production and Studies of Alumina Based Refractory Glass," Coutures et al., *Mat. Res. Bull.*, vol. 10, No. 6, 1975, pp. 539-546.

"Net Optical Gain at 1.53 µm in Er-Doped $Al_2O_3$ Waveguides on Silicon," van den Hoven et al., Appl. Phys. Lett. 68 (14), Apr. 1, 1966, pp. 1886-1888.

"Durable 3—5 µm Transmitting Infrared Window Materials," Harris et al., Infrared Physics & Technology 39, 1998, pp. 185-201.

"Erbium-Doped Phosphate Glass Waveguide on Silicon With 4.1 dB/cm Gain at 1.535 µm," Yan et al., Appl. Phys. Lett, 71 (20), Nov. 17, 1997.

U.S. Appl. No. 10/358,772, filed Feb. 5, 2003, Methods of Making Ceramic Particles.

U.S. Appl. No. 10/358,765, filed Feb. 5, 2003, Methods of Making Ceramics.

U.S. Appl. No. 10/358,910, filed Feb. 5, 2003, Ceramics and Methods of Making the Same.

U.S. Appl. No. 10/358,855, filed Feb. 5, 2003, $Al_2O_3$-$La_2O_3$-$Y_2O_3$-MgO Ceramics, and Methods of Making the Same.

U.S. Appl. No. 10/358,708, filed Feb. 5, 2003, Methods of Making $Al_2O_3$-$SiO_2$ Ceramics.

Abstract for "Kinetics of Nonisothermal Sintering of Some Eutectic Oxide Compositions," I. Yu Volkova et al., 1986 (abstract from Database Chemabs Online! Chemical Abstracts Service, Columbus, Ohio, US).

"Eutectic Precipitation of the Spinel Solid Solution-Yttrium Aluminum Garnet (YAG) System," Shuqiang Wang et al., *Journal of the American Ceramic Society*, 1998, vol. 81, No. 1, pp. 263-265.

"Microstructures of laser-treated $Al_2O_3$-$ZrO_2$-$CeO_2$ composites," Zan-Hwey Chen et al., *Materials Science & Engineering A (Structural Materials: Properties, Microstructure and Processing)*, 1995, vol. A196, No. 1-2, pp. 253-260.

"Advances in the Grinding Efficiency of Sintered Alumina Abrasives," Andreas Krell et al., *Journal of the American Ceramic Society*, 1996, vol. 79, No. 3, pp. 763-769.

"Interface modification for increased fracture toughness in reaction-formed yttrium aluminum garnet/alumina eutectic composites," Luke N. Brewer et al., 1999, vol. 14, No. 10, pp. 3907-3912.

Dow Jones Interactive Internet Printout on Jun. 20, 2001 for web address "http://ptg.djnr.com/ccroot/asp/publib/story.asp"; "China's Rare Earth Industry In the Doldrums", Asia Pulse, Jan. 28, 1999, 2 pages.

Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.

Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects On Hold", Industrial Minerals, Aug. 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6-7.

"Rare Earths Prices Recover Despite China's Overcapacity", Louise Rodriquez, America Metal Market, vol. 109, No. 14, Jan. 22, 2001, p. 13.

"Prices: Minerals", Asian Ceramics & Glass, Jan. 2001, 2 pages.

"China Rare Earth Information", China Rare Earth Information Center, vol. 6, No. 4, Aug. 2000, 3 pages.

"Microstructure and Thermal Stability of $Al_2O_3$/$Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English.

"Divorced Eutectic and Interface Characteristics in a Solidified YAG-Spinel Composite With Spinel-Rich Composition", S. Wang et al., J. Mat. Sci., 35, 2000, pp. 2757-2761.

"Processing, Microstructure, and Strength of Alumina-YAG Eutectic Polycrystals", Tai-Il Mah et al., J. Am. Ceram. Soc., 83, [8], 2000, pp. 2088-2090.

"Phase Identification of $Al_2O_3$/$RE_3Al_5O_{12}$ and $Al_2O_3$/$REAlO_3$ (RE=Sm-Lu, Y) Eutectics", J. Crystal Growth, 218, 2000, pp. 67-73.

"Crystallization and Thermal Properties of $Al_2O_3$-$Y_2O_3$ Melts", S. V. Stankus et al., J. Crystal Growth, 167, 1996, pp. 165-170.

Dialog © file 319: Chem Bus NewsBase © 2001 Royal Soc Chemistry. Abstract for "China: Oversupply Puts Rare Earths Projects On Hold", Industrial Minerals n 359, p. 10.

"Rare-Earth Metals", J. Hedrick, pp. 61.1-61.6, 1997.

"Rare-Earth Metal Prices in the USA ca. 1960 to 1994", J. Hedrick, J. Alloys and Compounds, 1997, pp. 471-481.

"Preliminary data on subsolidus phase equilibria in the $La_2O_3$-$Al_2O_3$-$Mn_2O_3$ and $La_2O_3$-$Al_2O_3$-$Fe_2O_3$ systems", Hrovat et al., *Journal of Materials Science Letters*, vol. 14, 1995, pp. 265-267.

"Aspects of Synthesis of Decorite Opacified Glass", Keramika, *Glass and Ceramics*, vol. 58, Nos. 1-2, pp. 8-11, Jan. 2001.

"A New Ceramic Eutectic Composite with High Strength at 1873 K", Yoshiharu Waku, *Advanced Materials*, vol. 10, No. 8, 1998, pp. 615-617.

"Synthesis of Y-Al Garnet", Krokhin et al., *Glass and Ceramics*, vol. 55, Nos. 5-6, 1998, pp. 151-152.

"High-temperature strength and thermal stability of a unidirectionally solidified $Al_2O_3$/YAG eutectic composite", Waku et al., pp. 1217-1225.

"Sapphire matrix composites reinforced with single crystal VAG phases", Waku et al., *Journal of Materials Science*, vol. 31, 1996, pp. 4663-4670.

"Thermo-Mechanical Stability Of Directionally Solidified $Al_2O_3$-$ZrO_2(Y_2O_3)$ Eutectic Fibers", Yang and Zhu, *Scripta Materialia*, vol. 36, No. 8, 1997, pp. 961-965.

"A ductile ceramic eutectic composite with high strength at 1,873 K", Waku et al., *Nature*, vol. 389, Sep. 1997, pp. 49-52.

"The Liquidus Surface In The $Al_2O_3$-$ZrO_2$-$Y_2O_3$ Phase Diagram", Lakiza et al., *Powder Metallurgy and Metal Ceramics*, vol. 33, No. 11-12, 1994, pp. 595-597.

"Powder-Material Research Methods And Properties Polythermal Sections Of The $Al_2O_3$-$ZrO_2$-$Y_2O_3$ Phase Diagram", Lakiza et al., *Powder Metallurgy and Metal Ceramics*, vol. 34, No. 11-12, 1995, pp. 655-659.

"Metastable Phase Relationships In The System $Al_2O_3$-$ZrO_2$-$Y_2O_3$", Lakiz and Lopato, *Powder Metallurgy and Metal Ceramics*, vol. 35, Nos. 11-12, 1996, pp. 621-626.

"Solidus Surface And Phase Equilibria During The Solidification Of Alloys In The $Al_2O_3$-$ZrO_2$-$Y_2O_3$ System", Lakiza et al., *Powder Metallurgy and Metal Ceramics*, vol. 34, Nos. 1-2, 1995, pp. 64-67.

"Methods Of Investigation Of Properties Of Powder Materials, Interactions In The $Al_2O_3$-$ZrO_2$-$Y_2O_3$ System", Lakiza et al., *Powder Metallurgy and Metal Ceramics*, vol. 33, Nos. 9-10, 1994, pp. 486-490.

"Rapid Solidification of Ceramics a Technology Assessment", Brockway et al. *Metals and Ceramics Information Center*, MCIC Report, Jan. 1984 MCIC 84-49.

Figs. 311, 346, 350, 354-56, 373, and 716, *Phase Diagrams For Ceramists*, The American Ceramic Society, 1964, pp. 122, 136, 138, 140, 144, 248.

Figs. 2340-44, 2363, 2370, 2374-75, 2382-83, 2385, 2387, 2390, and 2392, *Phase Diagrams For Ceramists, 1969 Supplement*, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, *Phase Diagrams For Ceramists, 1975 Supplement*, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5251, 5257, 5418, and 5437, *Phase Diagrams For Ceramists*, vol. IV, The American Ceramic Society, 1981, pp. 29, 125, 127, 129-131, 133, 135-137, 139, 141, 143, 220, 228.

Fig. 6464, *Phase Diagrams For Ceramists*, vol. VI, The American Ceramic Society, 1981, p. 162.

Figs. 9262, and 9264, *Phase Diagrams For Ceramists, vol. XI, Oxides*, The American Ceramic Society, 1995, pp. 105-106.

"Phase Equilibria in the Yttrium Oxide-Alumina System", Toropov et al., *Bulletin of the Academy of Sciences, USSR*, Division of Chemical Science, No. 7, Jul. 1964, pp. 1076-1081, A translation of *Seriya Khimicheskaya*.

McKittrick, Joanna, et al., "Non-stoichiometry and defect structures in rapidly solidified $MgO$-$Al_2O_3$-$ZrO_2$ ternary eutectics," *Materials Science and Engineering* A231 (1997) 90-97.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189.

Weber, J.K. Richard et al., "Glass Formation and Polyamorphism in Rare-Earth Oxide-Aluminum Oxide Compositions", J. American Ceramic Society, 83 [8], 2000, 1868-1872.

Aguilar, E.A., "Processing and crystallization of rapidly solidified $Al_2O_3$-$Y_2O_3$ fibres", British Ceramic Transactions, 2000, vol. 99, No. 6, pp. 256-259.

U.S. Patent Application entitled "Fused $Al_2O_3$-$Y_2O_3$ Eutectic Abrasive Particles, Abrasive Articles, And Methods Of Making And Using The Same", filed Jul. 19, 2000, Rosenflanz et al. having U.S. Appl. No. 09/620,262.

U.S. Patent Application entitled "Fused-$Al_2O_3$-$MgO$-$Y_2O_3$ Eutectic Abrasive Particles, Abrasive Articles, And Methods Of Making And Using The Same", filed Nov. 2, 2000, Rosenflanz having U.S. Appl. No. 09/704,843.

U.S. Patent Application entitled "Fused $Al_2O_3$ Rare Earth Oxide Eutectic Abrasive Particles, Abrasive Articles, And Methods Of Making And Using The Same", filed Jul. 19, 2000, Rosenflanz et al. having U.S. Appl. No. 09/618,879.

U.S. Patent Application entitled "Fused Abrasive Particles, Abrasive Articles, And Methods Of Making And Using The Same", filed Jul. 19, 2000, Rosenflanz et al. having U.S. Appl. No. 09/619,191.

U.S. Patent Application entitled "Fused Aluminum Oxycarbide/Nitride- $Al_2O_3$ Rare Earth Oxide Eutectic Abrasive Particles, Abrasive Articles, And Methods Of Making And Using The Same", filed Jul. 19, 2000, Rosenflanz having U.S. Appl. No. 09/619,289.

U.S. Patent Application entitled "Fused Aluminum Oxycarbide/Nitride-$Al_2O_3$ Rare Earth Oxide Eutectic Materials", filed Jul. 19, 2000, Rosenflanz having U.S. Appl. No. 09/619,106.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled "Fused $Al_2O_3$-Rare Earth Oxide-$ZrO_2$ Eutectic Materials", filed Jul. 19, 2000, Rosenflanz having U.S. Appl. No. 09/619,192.

U.S. Patent Application entitled "Fused $Al_2O_3$-Rare Earth Oxide-$ZrO_2$ Eutectic Abrasive Particles, Abrasive Articles, And Methods Of Making And Using The Same", filed Jul. 19, 2000, Rosenflanz having U.S. Appl. No. 09/619,744.

U.S. Patent Application entitled "Fused $Al_2O_3$ Rare Earth Oxide $ZrO_2$ Eutectic Materials", filed Jan. 30, 2001, Rosenflanz having U.S. Appl. No. 09/772,730.

U.S. Patent Application entitled "$Al_2O_3$-Rare Earth Oxide-$ZrO_2$/$HfO_2$ Materials, and Methods of Making and Using the Same", filed Aug. 2, 2002, Rosenflanz having U.S. Appl. No. 10/211,597.

U.S. Patent Application entitled "$Al_2O_3$-$Y_2O_3$-$ZrO_2$/$HfO_2$ Materials, and Methods of Making and Using the Same", filed Aug. 2, 2002, Rosenflanz having U.S. Appl. No. 10/211,638.

U.S. Patent Application entitled, "Abrasive Particles, and Methods of Making and Using the Same", filed Aug. 2, 2002, Rosenflanz having U.S. Appl. No. 10/211,629.

U.S. Patent Application entitled, "Abrasive Particles, and Methods of Making and Using the Same", filed Aug. 2, 2002, Rosenflanz et al. having U.S. Appl. No. 10/211,630.

U.S. Patent Application entitled, "Method for Making Amorphous Materials and Ceramics", filed Aug. 2, 2002, Rosenflanz et al. having U.S. Appl. No. 10/211,639.

U.S. Patent Application entitled, "Ceramic Marerials, Abrasive Particles, Abrasive Articles, and Methods of Making and Using the Same", filed Aug. 2, 2002, Rosenflanz having U.S. Appl No. 10/211,034.

U.S. Patent Application entitled, "Glass-Ceramics", filed Aug. 2, 2002, Rosenflanz having U.S. Appl. No. 10/211,044.

U.S. Patent Application entitled, "Alunmina-Zirconia, and Methods of Making and Using the Same", filed Aug. 2, 2002, Rosenflanz et al. having U.S. Appl. No. 10/211,620.

U.S. Patent Application entitled, "Method of Making Ceramic Articles", filed Aug. 2, 2002, Rosenflanz having U.S. Appl. No. 10/211,481.

U.S. Patent Application entitled "Plasma Spraying", filed Aug. 2, 2002, Rosenflanz et al. having U.S. Appl. No. 10/211,640.

U.S. Patent Application entitled "Method of Making Amorphous and Ceramics via Melt Spinning," filed Aug. 2, 2002, Rosenflanz et al. having U.S. Appl. No. 10/211,684.

U.S. Application entitled "Method of Making Abrasive Particles", filed Dec. 18, 2003, having U.S. Appl. No. 10/739,624.

U.S. Application entitled "Ceramics and Methods of Making and Using the Same", filed Jul. 29, 2004.

U.S. Application entitled "Method of Making Ceramic Articles", filed Jul. 29, 2004.

Kryuchkov, V.A., et al., "$Al_2O_3$-$ZrO_2$ Ceramics from Powders Produced by the Method of High-Speed Melt Solidification," Institute of Organic and Inorganic Chemistry of USSR Academy of Sciences (2004) pp. 19-21.

Adylov, G.T. et al., "Research on Mullite Produced by Melting in Solar Furnaces," Federal Technical Institute - Research and Production Association "Physics - Sun" - FTI NOP "Fizika -Solntse".

Bataliants et al., "Application of Low-Temperature Plasma in Glass and Glass Ceramic Industry," TSNIITEI Publishers (1973) pp. 26-27.

Batygin, V.N. et al., "Vacuum-Dense Ceramic and Its Alloys with Metals," Chemical-Mineralogical Composition and Structure.

Choudhury, Samrat, et al., "Bulk, Dense, Nanocrystalline Yttrium Aluminum Garnet by Consolidation of Amorphous Powders at Low Temperatures and High Pressures," J. Am. Ceram. Soc. 86[2] 247-51 (2003).

Kriuchkov et al., "$Al_2O_3$-$ZRO_2$ Ceramics Made of Powders Obtained by Technique of High-Speed Hardening from Melt," No. 5 Refractory Materials, 1989, No. 6, pp. 19-22.

Kryuchkov, V.A. et al., $Al_2O_3$-$ZRO_2$ Ceramics from Powders Produces by the Method of High-Speed Melt Solidification, Institute of Organic and Inorganic Chemistry of USSR Academy of Sciences, pp. 19-21.

McMillan, P.U., Glass Ceramic, (1967) pp. 26-27.

Pavlushkin, N.M., "Fundamentals of Glass Ceramics Technology," Stroyizdat Publishers, (1979) pp. 71-72.

Polling L., General Biochemistry, Moscow, Mir, 1964, pp. 426-427.

Shvedkov, E.L. et al, "Vocabulary-Dictionary of powder metallurgy", Kiev, "Naukova dumka", 1982. p. 17 "Amorphous condition", "Amorphous materials".

Strelov, K.K. . et al., "Technology of Refractory Materials," Metallurgiya Publishers, (1988) p. 137.

Zhou, Xinzhang, "Metastable Phase Formation in Plasma-SprayedZrO2 (Y2O3)-Ai2O3," Journal of the American Ceramic Society, vol. 86, No. 8 (2003) pp. 1415-1420.

U.S. Appl. No. 10/358,772, filed Feb. 5, 2003, "Methods of Making Ceramic Particles".

U.S. Appl. No. 10/358,765, filed Feb. 5, 2003, "Methods of Making Ceramics".

U.S. Appl. No. 10/358,910, filed Feb. 5, 2003, "Ceramics and Methods of Making the Same".

U.S. Appl. No. 10/358,855, filed Feb. 5, 2003, "$Al_2O_3La_2O_3$-MgO Ceramics, and Methods of Making the Same".

U.S. Appl. No. 10/358,708, filed Feb. 5, 2003, "Methods of Making $Al_2O_3$-$SiO_2$ Ceramics".

MacChesney, J.B. et al., "The System $La_2O_3$-$TiO_2$ Phase Equilibria and Electrical Properties," Bell Telephone Laboratories, Incorporated, Murray Hill, New Jersey.

Shishido, Toetsu et al., "Lo-M-O Glassed Obtained by Rapid Quenching Using a Laser Beam," Oarai Branch, Research Institute for Iron, Steel and Other Metals, Tohoku University, Ibaraki-ken, 311-13, Japan.

Topol, L.E. et al., "Formation of New Oxide Glasses by Laser Spin Melting and Free Fall Cooling," North America Rockwell Science Center, Thousand Oaks, California, 91360, USA.

White, R.W. et al., "A Lanthanum Titanium Porous Glass Ceramic," Council for Scientific Research, National Institute for Materials Research, Pretoria, Republic of South Africa.

U.S. Patent Application entitled "Metal Oxide Ceramic and Method of Making Articles Therewith," filed Jan. 15, 2007, Rosenflanz having U.S. Appl. No. 11/623,129.

U.S. Patent Application entitled "A12O3-Rare Earth Oxide-ZrO2/HFO2 Materials, and Methods of Making and Using the Same," filed Jun. 26, 2007, Rosenflanz having U.S. Appl. No. 11/768,806.

Adylov. G.T. et al., "Research on Mullite Produced by Melting Solar Furnaces," Federal Technical Institute - Research and Production Association "Physics - Sun" FTI NOP "Fizka - Solnlse".

Balaliants et al., "application of Low-temperature Plasma in Glass and Glass Ceramic Industry," TSNIITEI Publishers (1973) pp. 26-27.

Batygin, V.N. et al., "Vacuum-Dense Ceramic and Its Alloys with Metals," Chemical-Mineralogical Composition and Structure.

Choudhury, Samarat, et al., "Bulk, Dense, Nanocrystalline Yttrium Aluminum Garnet by Consolidation of Amorphous Powders at Low Temperatures and High Pressures," J. Am. Ceram. Soc. 86[2] 247-51 (2003).

Kriuchkov, et al., "$Al_2O_3$-$ZRO_2$ Ceramics Med of Powders Obtained by Technique of High-Speed Hardening From Melt," Refractory Materials, (1989) pp. 19-22.

Kriuchkov, et al., "$Al_2O_3$-$ZRO_2$ Ceramics From Powders Produced by the Method of High-Speed Melt Solidification," Institute of Organic and Inorganic Chemistry of USSR Academy of Sciences, pp. 19-21.

McMillan, P.U., "Glass Ceramic," (1967) pp. 26-27.

Pavlushkin, N.M., "Fundamentals of Glass Ceramics Technology," Stroyizdat Publishers, (1979) pp. 71-72.

Polling L, General Biochemistry, Moscow, Mir, 1964, pp. 426-427.

Shvedkov E.L., et al., "Dictionary-Reference Guide of the Metal Powder Industry," Naukova-Dumka, (1982) p. 17.

Strelov, K.K. et al., "Technology of Refractory Materials," *Metallurgiya Publishers*, (1988), p. 137.

Zhou, Xinzhang, "Metastable Phase Formation in Plasma-Sprayed $ZRO_2(Y_2O_3)$-$AI_2O_3$,"Journal of the American Ceramic Society, vol. 86, No. 8 (2003) pp. 1415-1420.

* cited by examiner

ABRASIVE PARTICLES, ABRASIVE ARTICLES, AND METHODS OF MAKING AND USING THE SAME

This application is a continuation-in-part of U.S. Ser. Nos. 09/922,526, 09/922,527, 09/922,528, and 09/922,530, filed Aug. 2, 2001 now abandoned, the disclosures of which are incorporated herein by reference.

FIELD OF THE INVENTION

This invention relates to abrasive particles and methods of making the same. The abrasive particles can be incorporated into a variety of abrasive articles, including bonded abrasives, coated abrasives, nonwoven abrasives, and abrasive brushes.

DESCRIPTION OF RELATED ART

A variety of abrasive particles (e.g., diamond particles, cubic boron nitride particles, fused abrasive particles, and sintered, ceramic abrasive particles (including sol-gel-derived abrasive particles) known in the art. In some abrading applications, the abrasive particles are used in loose form, while in others the particles are incorporated into abrasive products (e.g., coated abrasive products, bonded abrasive products, non-woven abrasive products, and abrasive brushes). Criteria used in selecting abrasive particles used for a particular abrading application include: abrading life, rate of cut, substrate surface finish, grinding efficiency, and product cost.

From about 1900 to about the mid-1980's, the premier abrasive particles for abrading applications such as those utilizing coated and bonded abrasive products were typically fused abrasive particles. There are two general types of fused abrasive particles: (1) fused alpha alumina abrasive particles (see, e.g., U.S. Pat. No. 1,161,620 (Coulter), U.S. Pat. No. 1,192,709 (Tone), U.S. Pat. No. 1,247,337 (Saunders et al.), 1,268,533 (Allen), and U.S. Pat. No. 2,424,645 (Baumann et al.)), and (2) fused (sometimes also referred to as "co-fused") alumina-zirconia abrasive particles (see, e.g., U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), and U.S. Pat. No. 5,143,522 (Gibson et al.)) (also see, e.g., U.S. Pat. No. 5,023,212 (Dubots et al.) and U.S. Pat. No. 5,336,280 (Dubots et al.) which report the certain fused oxynitride abrasive particles). Fused alumina abrasive particles are typically made by charging a furnace with an alumina source such as aluminum ore or bauxite, as well as other desired additives, heating the material above its melting point, cooling the melt to provide a solidified mass, crushing the solidified mass into particles, and then screening and grading the particles to provide the desired abrasive particle size distribution. Fused alumina-zirconia abrasive particles are typically made in a similar manner, except the furnace is charged with both an alumina source and a zirconia source, and the melt is more rapidly cooled than the melt used to make fused alumina abrasive particles. For fused alumina-zirconia abrasive particles, the amount of alumina source is typically about 50–80 percent by weight, and the amount of zirconia, 50–20 percent by weight zirconia. The processes for making the fused alumina and fused alumina abrasive particles may include removal of impurities from the melt prior to the cooling step.

Although fused alpha alumina abrasive particles and fused alumina-zirconia abrasive particles are still widely used in abrading applications (including those utilizing coated and bonded abrasive products, the premier abrasive particles for many abrading applications since about the mid-1980's are sol-gel-derived alpha alumina particles (see, e.g., U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 4,960,441 (Pellow et al.), U.S. Pat. No. 5,139,978 (Wood), U.S. Pat. No. 5,201,916 (Berg et al.), U.S. Pat. No. 5,366,523 (Rowenhorst et al.), U.S. Pat. No. 5,429,647 (Larmie), U.S. Pat. No. 5,547,479 (Conwell et al.), U.S. Pat. No. 5,498,269 (Larmie), U.S. Pat. No. 5,551,963 (Larmie), and U.S. Pat. No. 5,725,162 (Garg et al.)).

The sol-gel-derived alpha alumina abrasive particles may have a microstructure made up of very fine alpha alumina crystallites, with or without the presence of secondary phases added. The grinding performance of the sol-gel-derived abrasive particles on metal, as measured, for example, by life of abrasive products made with the abrasive particles was dramatically longer than such products made from conventional fused alumina abrasive particles.

Typically, the processes for making sol-gel-derived abrasive particles are more complicated and expensive than the processes for making conventional fused abrasive particles. In general, sol-gel-derived abrasive particles are typically made by preparing a dispersion or sol comprising water, alumina monohydrate (boehmite), and optionally peptizing agent (e.g., an acid such as nitric acid), gelling the dispersion, drying the gelled dispersion, crushing the dried dispersion into particles, screening the particles to provide the desired sized particles, calcining the particles to remove volatiles, sintering the calcined particles at a temperature below the melting point of alumina, and screening and grading the particles to provide the desired abrasive particle size distribution. Frequently a metal oxide modifier(s) is incorporated into the sintered abrasive particles to alter or otherwise modify the physical properties and/or microstructure of the sintered abrasive particles.

There are a variety of abrasive products (also referred to "abrasive articles") known in the art. Typically, abrasive products include binder and abrasive particles secured within the abrasive product by the binder. Examples of abrasive products include: coated abrasive products, bonded abrasive products, nonwoven abrasive products, and abrasive brushes.

Examples of bonded abrasive products include: grinding wheels, cutoff wheels, and honing stones. The main types of bonding systems used to make bonded abrasive products are: resinoid, vitrified, and metal. Resinoid bonded abrasives utilize an organic binder system (e.g., phenolic binder systems) to bond the abrasive particles together to form the shaped mass (see, e.g., U.S. Pat. No. 4,741,743 (Narayanan et al.), U.S. Pat. No. 4,800,685 (Haynes et al.), U.S. Pat. No. 5,037,453 (Narayanan et al.), and U.S. Pat. No. 5,110,332 (Narayanan et al.)). Another major type are vitrified wheels in which a glass binder system is used to bond the abrasive particles together mass (see, e.g., U.S. Pat. No. 4,543,107 (Rue), U.S. Pat. No. 4,898,587 (Hay et al.), U.S. Pat. No. 4,997,461 (Markhoff-Matheny et al.), and U.S. Pat. No. 5,863,308 (Qi et al.)). These glass bonds are usually matured at temperatures between 900° C. to 1300° C. Today vitrified wheels utilize both fused alumina and sol-gel-derived abrasive particles. However, fused alumina-zirconia is generally not incorporated into vitrified wheels due in part to the thermal stability of alumina-zirconia. At the elevated temperatures at which the glass bonds are matured, the physical properties of alumina-zirconia degrade, leading to a significant decrease in their abrading performance. Metal bonded abrasive products typically utilize sintered or plated metal to bond the abrasive particles.

The abrasive industry continues to desire abrasive particles and abrasive products that are easier to make, cheaper to make, and/or provide performance advantage(s) over conventional abrasive particles and products.

SUMMARY OF THE INVENTION

Some embodiments of the present invention include abrasive particles comprising alpha alumina having at least one of an average crystal size not greater than 150 nanometers, wherein the abrasive particles have a density of at least 90 (in some embodiments at least 92, 95, 96, 97, 98, 99, 99.5 or even 100) percent of theoretical density. In some embodiments, preferably at least 75 (80, 85, 90, 95, 97, or even at least 99) percent by number of the crystal sizes are not greater than 150 nanometers.

Some embodiments of the present invention include abrasive particles comprising alpha alumina, wherein at least 90 (in some embodiments preferably, 95, or even 100) percent by number of the alpha alumina present in the particles have crystal sizes not greater than 200 nanometers, and wherein the abrasive particles have a density of at least 90 (in some embodiments at least 95, 96, 97, 98, 99, 99.5, or even 100) percent of theoretical density.

Some embodiments of the present invention include abrasive particles comprising a glass-ceramic, the glass-ceramic comprising alpha $Al_2O_3$, crystalline $ZrO_2$, and a first complex $Al_2O_3.Y_2O_3$, wherein at least one of the alpha $Al_2O_3$, the crystalline $ZrO_2$, or the first complex $Al_2O_3.Y_2O_3$ has an average crystal size not greater than 150 nanometers, and wherein the abrasive particles have a density of at least 90 (in some embodiments at least 95, 96, 97, 98, 99, 99.5 or even 100) percent of theoretical density. In some embodiments, preferably at least 75 (80, 85, 90, 95, 97, or even at least 99) percent by number of the crystal sizes are not greater than 150 nanometers. In some embodiments preferably, the glass-ceramic further comprises a second, different complex $Al_2O_3.Y_2O_3$. In some embodiments preferably, the glass-ceramic further comprises a complex $Al_2O_3.REO$.

Some embodiments of the present invention include abrasive particles comprising a glass-ceramic, the glass-ceramic comprising a first complex $Al_2O_3.Y_2O_3$, a second, different complex $Al_2O_3.Y_2O_3$, and crystalline $ZrO_2$, wherein for at least one of the first complex $Al_2O_3.Y_2O_3$, the second complex $Al_2O_3.Y_2O_3$, or the crystalline $ZrO_2$, at least 90 (in some embodiments preferably, 95, or even 100) percent by number of the crystal sizes thereof are not greater than 200 nanometers, and wherein the abrasive particles have a density of at least 90 (in some embodiments at least 95, 96, 97, 98, 99, 99.5, or even 100) percent of theoretical density. In some embodiments preferably, the glass-ceramic further comprises a second, different complex $Al_2O_3.Y_2O_3$. In some embodiments preferably, the glass-ceramic particles further comprises a complex $Al_2O_3.REO$.

Some embodiments of the present invention include abrasive particles comprising a glass-ceramic, the glass-ceramic comprising alpha $Al_2O_3$, crystalline $ZrO_2$, and a first complex $Al_2O_3.REO$, wherein at least one of the alpha $Al_2O_3$, the crystalline $ZrO_2$, or the first complex $Al_2O_3.REO$ has an average crystal size not greater than 150 nanometers, and wherein the abrasive particles have a density of at least 90 (in some embodiments at least 95, 96, 97, 98, 99, 99.5, or even 100) percent of theoretical density. In some embodiments, preferably at least 75 (80, 85, 90, 95, 97, or even at least 99) percent by number of the crystal sizes are not greater than 150 nanometers. In some embodiments preferably, the glass-ceramic further comprises a second, different complex $Al_2O_3.REO$. In some embodiments preferably, the glass-ceramic further comprises a complex $Al_2O_3.Y_2O_3$.

Some embodiments of the present invention include abrasive particles comprising a glass-ceramic, the glass-ceramic comprising a first complex $Al_2O_3.REO$, a second, different complex $Al_2O_3.REO$, and crystalline $ZrO_2$, wherein for at least one of the first complex $Al_2O_3.REO$, the second complex $Al_2O_3.REO$, or the crystalline $ZrO_2$, at least 90 (in some embodiments preferably, 95, or even 100) percent by number of the crystal sizes thereof are not greater than 200 nanometers), and wherein the abrasive particles have a density of at least 90 (in some embodiments at least 95, 96, 97, 98, 99, 99.5, or even 100) percent of theoretical density. In some embodiments preferably, the glass-ceramic further comprises a complex $Al_2O_3.Y_2O_3$.

Some embodiments of the present invention include abrasive particles comprising a glass-ceramic, the glass-ceramic comprising a first complex $Al_2O_3.Y_2O_3$, a second, different complex $Al_2O_3.Y_2O_3$, and crystalline $ZrO_2$, wherein at least one of the first complex $Al_2O_3.Y_2O_3$, the second, different complex $Al_2O_3.Y_2O_3$, or the crystalline $ZrO_2$ has an average crystal size not greater than 150 nanometers, and wherein the abrasive particles have a density of at least 90 (in some embodiments at least 95, 96, 97, 98, 99, 99.5, or even 100) percent of theoretical density. In some embodiments, preferably at least 75 (80, 85, 90, 95, 97, or even at least 99) percent by number of the crystal sizes are not greater than 150 nanometers. In some embodiments preferably, the glass-ceramic further comprises a second, different complex $Al_2O_3.Y_2O_3$. In some embodiments preferably, the glass-ceramic further comprises a complex $Al_2O_3.REO$.

Some embodiments of the present invention include abrasive particles comprising a glass-ceramic, the glass-ceramic comprising a first complex $Al_2O_3.Y_2O_3$, a second, different complex $Al_2O_3.Y_2O_3$, and crystalline $ZrO_2$, wherein for at least one of the first complex $Al_2O_3.Y_2O_3$, the second, different complex $Al_2O_3.Y_2O_3$, or the crystalline $ZrO_2$, at least 90 (in some embodiments preferably, 95, or even 100) percent by number of the crystal sizes thereof are not greater than 200 nanometers, and wherein the abrasive particles have a density of at least 90 (in some embodiments at least 95, 96, 97, 98, 99, 99.5, or even 100) percent of theoretical density. In some embodiments preferably, the glass-ceramic further comprises a complex $Al_2O_3.REO$.

Some embodiments of the present invention include abrasive particles comprising a glass-ceramic, the glass-ceramic comprising a first complex $Al_2O_3.REO$, a second, different complex $Al_2O_3.REO$, and crystalline $ZrO_2$, wherein at least one of the first complex $Al_2O_3.REO$, the second, different complex $Al_2O_3.REO$, or the crystalline $ZrO_2$ has an average crystal size not greater than 150 nanometers, and wherein the abrasive particles have a density of at least 90 (in some embodiments at least 95, 96, 97, 98, 99, 99.5, or even 100) percent of theoretical density. In some embodiments, preferably at least 75 (80, 85, 90, 95, 97, or even at least 99) percent by number of the crystal sizes are not greater than 150 nanometers. In some embodiments preferably, the glass-ceramic further comprises a second, different complex $Al_2O_3.REO$. In some embodiments preferably, the glass-ceramic further comprises a complex $Al_2O_3.Y_2O_3$.

Some embodiments of the present invention include abrasive particles comprising a glass-ceramic, the glass-ceramic comprising a first complex $Al_2O_3.REO$, a second, different complex $Al_2O_3.REO$, and crystalline $ZrO_2$, wherein for at least one of the first complex $Al_2O_3$.REO, the second, different complex $Al_2O_3$.REO, or the crystalline $ZrO_2$, at least 90 (in some embodiments preferably, 95, or even 100) percent by number of the crystal sizes thereof are not greater than 200 nanometers, and wherein the abrasive particles have a density of at least 90 (in some embodiments at least 95, 96, 97, 98, 99, 99.5, or even 100) percent of theoretical density. In some embodiments preferably, the glass-ceramic further comprises a complex $Al_2O_3.Y_2O_3$.

Abrasive particles according to the present invention are useful, for example, in loose form or used incorporated into abrasive articles.

Abrasive articles according to the present invention comprise binder and a plurality of abrasive particles, wherein at least a portion of the abrasive particles are the abrasive particles according to the present invention (e.g., abrasive particles comprising at least one of alpha alumina having at least one of an average crystal size not greater than 150 nanometers, abrasive particles comprising alpha alumina, wherein at least 90 percent by number of the alpha alumina have crystal sizes are not greater than 200 nanometers, etc.). Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments preferably, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles according to the present invention, based on the total weight of the abrasive particles in the abrasive article. Optionally at least a portion of the plurality of abrasive particles comprise alpha alumina having crystal sizes greater than 200 nanometers.

Abrasive particles are usually graded to a given particle size distribution before use. Such distributions typically have a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles according to the present invention. In some embodiments preferably, at least 5, 10, 15, 20, 25, 30, 35, 40, 45, 50, 55, 60, 65, 70, 75, 80, 85, 90, 95, or even 100 percent by weight of the plurality of abrasive particles are the abrasive particles according to the present invention, based on the total weight of the plurality of abrasive particles. Optionally at least a portion of the plurality of abrasive particles comprise alpha alumina having crystal sizes greater than 200 nanometers.

In this application:

"amorphous material" refers to material derived from a melt and/or vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes amorphous material, glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$. metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3$.REO" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramics comprising crystals formed by heat-treating amorphous material;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3$.metal oxide, etc.) is crystalline, for example, in a glass-ceramic, it may be amorphous, crystalline, or portions amorphous and portions crystalline. For example if a glass-ceramic comprises $Al_2O_3$ and $ZrO_2$, the $Al_2O_3$ and $ZrO_2$ may each be in an amorphous state, crystalline state, or portions in an amorphous state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides.

Further, it is understood that glass-ceramics formed by heating amorphous material not exhibiting a $T_g$ may not actually comprise glass, but rather may comprise the crystals and amorphous material that does not exhibiting a $T_g$.

In another aspect, the present invention provides a method of abrading a surface, the method comprising:

providing an abrasive article comprising a binder and a plurality of abrasive particles, wherein at least a portion of the abrasive particles according to the present invention;

contacting at least one of the abrasive particles according to the present invention with a surface of a workpiece; and moving at least one of the contacted abrasive particles according to the present invention or the contacted surface to abrade at least a portion of the surface with the contacted abrasive particle according to the present invention.

DETAILED DESCRIPTION

Figure 1:
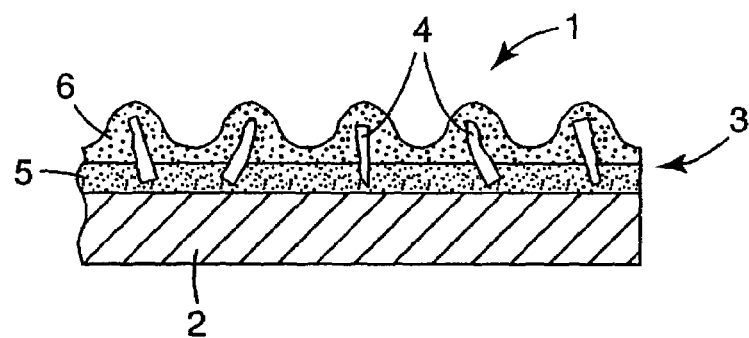
FIG. 1 is a fragmentary cross-sectional schematic view of a coated abrasive article including abrasive particles according to the present invention.

Abrasive particles according to the present invention can be made, for example, by crystallizing amorphous material (e.g., glass) or amorphous material in a ceramic comprising the amorphous material to provide a glass-ceramic. In some embodiments preferably amorphous materials, and the glass-ceramics made there from, contain not more than 30 (in some embodiments preferably, not more than 25, 20, 15, 10, 5, 4, 3, 2, 1, or even zero) percent by weight collectively $As_2O_3$, $B_2O_3$, $GeO_2$, $P_2O_5$, $SiO_2$, $TeO_2$, and $V_2O_5$, based on the total weight of the amorphous material or glass-ceramic.

In some embodiments preferably, abrasive particles according to the present invention comprise at least 35, 40, 45, 50, 55, 60, 65, or even at least 70% by weight $Al_2O_3$, based on the total weight of the abrasive particle.

Some amorphous materials used to make glass-ceramics according to the present invention, and the glass-ceramics made there from, comprise 20 to at least 70 percent by weight (in some embodiments, 30 to at least 70 percent, 40 to at least 70 percent, 50 to at least 70 percent, or even 60 to at least 70 percent) $Al_2O_3$; 0 to 50 percent by weight (in some embodiments, 0 to 25 percent; or even 0 to 10 percent) $Y_2O_3$; and 0 to 50 percent by weight (in some embodiments, 0 to 25 percent; or even 0 to 10 percent) at least one of $ZrO_2$ or $HfO_2$, based on the total weight of the amorphous material or glass-ceramic. In some embodiments, such amorphous materials used to make glass-ceramics according to the present invention, and the glass-ceramics made there from, comprise at least 30 percent by weight, at least 40 percent by weight, at least 50 percent by weight, at least 60 percent by weight, or even at least 70 percent by weight $Al_2O_3$, based on the total weight of the amorphous material or glass-ceramic. In some embodiments, such amorphous materials, and the glass-ceramics made there from, contain less than 40 (in some embodiments, less than 35, 30, 25, 20, 15, 10, 5, 4, 3, 2, 1, or even zero) percent by weight collectively $SiO_2$, $B_2O_3$, and $P_2O_5$, based on the total weight of the amorphous material or glass-ceramic. In some embodiments, such amorphous materials, and the glass-ceramics made there from, contain less than 20 (in some embodiments, less than 15, 10, 5, or even zero) percent by weight $SiO_2$ and less than 20 (preferably, less than 15, 10, 5, or even zero) percent by weight $B_2O_3$, based on the total weight of the amorphous material or glass-ceramic.

Some amorphous materials used to make glass-ceramics according to the present invention, and the glass-ceramics made there from, comprise 20 to at least 70 percent by weight (in some embodiments, 30 to at least 70 percent, 40 to at least 70 percent, 50 to at least 70 percent, or even 60 to at least 70 percent) $Al_2O_3$; 0 to 50 percent by weight (in some embodiments, 0 to 25 percent; or even 0 to 10 percent) REO; 0 to 50 percent by weight (in some embodiments, 0 to 25 percent; or even 0 to 10 percent) at least one of $ZrO_2$ or $HfO_2$, based on the total weight of the amorphous material or glass-ceramic. In some embodiments, such amorphous materials, and the glass-ceramics made there from, comprise at least 30 percent by weight, at least 40 percent by weight, at least 50 percent by weight, at least 60 percent by weight, or even at least 70 percent by weight $Al_2O_3$, based on the total weight of the amorphous material or glass-ceramic. In some embodiments, such amorphous materials, and the glass-ceramics made there from, comprise less than 40 (in some embodiments, less than 35, 30, 25, 20, 15, 10, 5, 4, 3, 2, 1, or even zero) percent by weight collectively $SiO_2$, $B_2O_3$, and $P_2O_5$, based on the total weight of the amorphous materials or glass-ceramic. In some embodiments, such glasses, and the glass-ceramics made there from, contain less than 20 (in some embodiments, less than 15, 10, 5, or even zero) percent by weight $SiO_2$ and less than 20 (in some embodiments, less than 15, 10, 5, or even zero) percent by weight $B_2O_3$, based on the total weight of the amorphous material or glass-ceramic.

Some amorphous materials used to make glass-ceramics according to the present invention, and the glass-ceramics made there from, comprise 20 to at least 70 percent by weight (in some embodiments, 30 to at least 70 percent, 40 to at least 70 percent, 50 to at least 70 percent, or even 60 to 70 percent) $Al_2O_3$; 0 to 50 percent by weight (in some embodiments, 0 to 25 percent; or even 0 to 10 percent) $Y_2O_3$; 0 to 50 percent by weight (in some embodiments, 0 to 25 percent; or even 0 to 10 percent) REO, 0 to 50 percent by weight (in some embodiments, 0 to 25 percent; or even 0 to 10 percent) at least one of $ZrO_2$ or $HfO_2$, based on the total weight of the amorphous material or glass-ceramic. In some embodiments, such amorphous materials, and the glass-ceramics made there from, comprise at least 30 percent by weight, at least 40 percent by weight, at least 50 percent by weight, at least 60 percent by weight, or even at least 70 percent by weight $Al_2O_3$, based on the total weight of the amorphous material or glass-ceramic. In some embodiments, such amorphous materials, and the glass-ceramics made there from, contain less than 40 (in some embodiments, less than 35, 30, 25, 20, 15, 10, 5, 4, 3, 2, 1, or even zero) percent by weight collectively $SiO_2$, $B_2O_3$, and $P_2O_5$, based on the total weight of the amorphous material or glass-ceramic. In some embodiments, such amorphous materials, and the glass-ceramics made there from, contain less than 20 (in some embodiments, less than 15, 10, 5, or even zero) percent by weight $SiO_2$ and less than 20 (in some embodiments, less than 15, 10, 5, or even zero) percent by weight $B_2O_3$, based on the total weight of the amorphous material or glass-ceramic.

Amorphous materials (e.g., glasses), ceramics comprising the amorphous material, particles comprising the amorphous material, etc. can be made, for example, by heating (including in a flame) the appropriate metal oxide sources to form a melt, desirably a homogenous melt, and then rapidly cooling the melt to provide amorphous material. Embodiments of amorphous materials can be made, for example, by melting the metal oxide sources in any suitable furnace (e.g., an inductive heated furnace, a gas-fired furnace, or an electrical furnace), or, for example, in a plasma. The resulting melt is cooled (e.g., discharging the melt into a cooling media (e.g., high velocity air jets, liquids, metal plates (including chilled metal plates), metal rolls (including chilled metal rolls), metal balls (including chilled metal balls), and the like)).

Embodiments of, amorphous material can be made utilizing flame fusion as disclosed, for example, in U.S. Pat. No. 6,254,981 (Castle), the disclosure of which is incorporated herein by reference. In this method, the metal oxide sources materials are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, air, or the like. Feed particles can be formed, for example, by grinding, agglomerating (e.g., spray-drying),melting, or sintering the metal oxide sources. The size of feed particles fed into the flame generally determine the size of the resulting amorphous material comprising particles.

Embodiments of amorphous materials can also be obtained by other techniques, such as: laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et al., Metals And Ceramics Information Center, A Department of Defense Information Analysis Center, Columbus, Ohio, January, 1984, the disclosure of which is incorporated here as a reference). Embodiments of amorphous materials may also be obtained by other techniques, such as: thermal (including flame or laser or plasma-assisted) pyrolysis of suitable precursors, physical vapor synthesis (PVS) of metal precursors and mechanochemical processing.

Useful amorphous material formulations include those at or near a eutectic composition(s) (e.g., binary and ternary eutectic compositions). In addition to compositions disclosed herein, other compositions, including quaternary and other higher order eutectic compositions, may be apparent to those skilled in the art after reviewing the present disclosure.

Typically, amorphous materials, and the glass-ceramics made there from, have x, y, and z dimensions each perpendicular to each other, and wherein each of the x, y, and z dimensions is at least 25 micrometers. In some embodiments, the x, y, and z dimensions is at least 50 micrometers, 75 micrometers, 100 micrometers, 250 micrometers, 500 micrometers, 1000 micrometers, 2000 micrometers, 2500 micrometers, 1 mm, or even at least 5 mm. The x, y, and z dimensions of a material are determined either visually or using microscopy, depending on the magnitude of the dimensions. The reported z dimension is, for example, the diameter of a sphere, the thickness of a coating, or the longest length of a prismatic shape.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide -other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Other useful metal oxide may also include, on a theoretical oxide basis, BaO, CaO, $Cr_2O_3$, CoO, $Fe_2O_3$, $GeO_2$, $Li_2O$, MgO, MnO, NiO, $Na_2O$, $Sc_2O_3$, SrO, $TiO_2$, ZnO, and combinations thereof. Sources, including commercial sources, include the oxides themselves, complex oxides, ores, carbonates, acetates, nitrates, chlorides, hydroxides, etc. These metal oxides are added to modify a physical property of the resulting abrasive particles and/or improve processing. These metal oxides are typically are added anywhere from 0 to 50% by weight, in some embodiments preferably 0 to 25% by weight and more preferably 0 to 50% by weight of the glass-ceramic depending, for example, upon the desired property.

The particular selection of metal oxide sources and other additives for making ceramics according to the present invention typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

In some instances, it may be preferred to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, ores, carbonates, acetates, nitrates, chlorides, hydroxides, etc. These metal oxides may be added, for example, to modify a physical property of the resulting abrasive particles and/or improve processing. These metal oxides when used are typically are added from greater than 0 to 20% by weight, preferably greater than 0 to 5% by weight and more preferably greater than 0 to 2% by weight of the glass-ceramic depending, for example, upon the desired property.

In some embodiments, it may be advantageous for at least a portion of a metal oxide source (in some embodiments, preferably, 10, 15, 20, 25, 30, 35, 40, 45, or even at least 50 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise metal them with the other raw materials. Although not wanting to be bound by theory, it is believed that the heat resulting from the exothermic reaction associated with the oxidation of the metal is beneficial in the formation of a homogeneous melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles with x, y, and z dimensions over 150 micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of amorphous material that otherwise could not be made, or could not be made in the desired size. Another advantage of the invention include, in forming the amorphous materials, that many of the chemical and physical processes such as melting, densification and spherodizing can be achieved in a short time, so that very high quench rates be can achieved. For additional details, see copending application having U.S. Ser. No. 10/211,639, filed the same date as the instant application, the disclosure of which is incorporated herein by reference.

The addition of certain metal oxides may alter the properties and/or crystalline structure or microstructure of glass-ceramic comprising abrasive particles according to the present invention, as well as the processing of the raw materials and intermediates in making the ceramic. For example, oxide additions such as MgO, CaO, $Li_2O$, and $Na_2O$ have been observed to alter both the $T_g$ (for a glass) and $T_x$ (wherein $T_x$ is the crystallization temperature) of amorphous material. Although not wishing to be bound by theory, it is believed that such additions influence amorphous material formation. Further, for example, such oxide-additions may decrease the melting temperature of the overall system (i.e., drive the system toward lower melting eutectic), and ease of amorphous material-formation. Complex eutectics in multi component systems (quaternary, etc.) may result in better amorphous materials-forming ability. The viscosity of the liquid melt and viscosity of the glass in its' "working" range may also be affected by the addition of certain metal oxides such as MgO, CaO, $Li_2O$, and $Na_2O$. It is also within the scope of the present invention to incorporate at least one of halogens (e.g., fluorine and chlorine), or chalcogenides (e.g., sulfides, selenides, and tellurides) into the amorphous materials, and the glass-ceramics made there from.

Crystallization of the amorphous material and ceramic comprising the amorphous material may also be affected by the additions of certain materials. For example, certain metals, metal oxides (e.g., titanates and zirconates), and fluorides, for example, may act as nucleation agents resulting in beneficial heterogeneous nucleation of crystals. Also, addition of some oxides may change nature of metastable phases devitrifying from the amorphous material upon reheating. In another aspect, for ceramics comprising crystalline $ZrO_2$, it may be desirable to add metal oxides (e.g., $Y_2O_3$, $TiO_2$, CaO, and MgO) that are known to stabilize tetragonal/cubic form of $ZrO_2$.

The particular selection of metal oxide sources and other additives for making ceramics according to the present invention typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

The metal oxide sources and other additives can be in any form suitable to the process and equipment being used to make the ceramic comprising abrasive particles according to the present invention. The raw materials can be melted and quenched using techniques and equipment known in the art for making oxide amorphous materials and amorphous metals. Desirable cooling rates include those of 50K/s and greater. Cooling techniques known in the art include roll-chilling. Roll-chilling can be carried out, for example, by melting the metal oxide sources at a temperature typically 20–200° C. higher than the melting point, and cooling/quenching the melt by spraying it under high pressure (e.g., using a gas such as air, argon, nitrogen or the like) onto a high-speed rotary roll(s). Typically, the rolls are made of metal and are water cooled. Metal book molds may also be useful for cooling/quenching the melt.

Other techniques for forming melts, cooling/quenching melts, and/or otherwise forming amorphous material include vapor phase quenching, melt-extraction, plasma spraying, and gas or centrifugal atomization. Vapor phase quenching can be carried out, for example, by sputtering, wherein the metal alloys or metal oxide sources are formed into a sputtering target(s) which are used. The target is fixed at a predetermined position in a sputtering apparatus, and a substrate(s) to be coated is placed at a position opposing the target(s). Typical pressures of $10^{-3}$ torr of oxygen gas and Ar gas, discharge is generated between the target(s) and a substrate(s), and Ar or oxygen ions collide against the target to start reaction sputtering, thereby depositing a film of composition on the substrate. For additional details regarding plasma spraying, see, for example, copending application having U.S. Ser. No. 10/211,640, filed the same date as the instant application, the disclosure of which is incorporated herein by reference.

Gas atomization involves melting feed particles to convert them to melt. A thin stream of such melt is atomized through contact with a disruptive air jet (i.e., the stream is divided into fine droplets). The resulting substantially discrete, generally ellipsoidal amorphous material comprising particles (e.g., beads) are then recovered. Examples of bead sizes include those having a diameter in a range of about 5 micrometers to about 3 mm. Melt-extraction can be carried out, for example, as disclosed in U.S. Pat. No. 5,605,870 (Strom-Olsen et al.), the disclosure of which is incorporated herein by reference. Containerless glass forming techniques utilizing laser beam heating as disclosed, for example, in PCT application having Publication No. WO 01/27046 A1, published Apr. 4, 2001, the disclosure of which is incorporated herein by reference, may also be useful in making materials according to the present invention.

The cooling rate is believed to affect the properties of the quenched amorphous material. For instance, glass transition temperature, density and other properties of glass typically change with cooling rates.

Typically, it is preferred that the bulk material comprises at least 50, 60, 75, 80, 85, 90, 95, 98, 99, or even 100 percent by weight of the amorphous material.

Rapid cooling may also be conducted under controlled atmospheres, such as a reducing, neutral, or oxidizing environment to maintain and/or influence the desired oxidation states, etc. during cooling. The atmosphere can also influence amorphous material formation by influencing crystallization kinetics from undercooled liquid. For example, larger undercooling of $Al_2O_3$ melts without crystallization has been reported in argon atmosphere as compared to that in air.

The microstructure or phase composition (glassy/amorphous/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous yield can be calculated for beads using a −100+120 mesh size fraction (i.e., the fraction collected between 150-micrometer opening size and 125-micrometer opening size screens). The measurements are done in the following manner. A single layer of beads is spread out upon a glass slide. The beads are observed using an optical microscope. Using the crosshairs in the optical microscope eyepiece as a guide, beads that lay along a straight line are counted either amorphous or crystalline depending on their optical clarity. A total of 500 beads are counted and a percent amorphous yield is determined by the amount of amorphous beads divided by total beads counted.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs-can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material. The existence of both a broad peak and well-defined peaks is taken as an indication of existence of crystalline matter within an amorphous matrix.

The initially formed amorphous material or ceramic (including glass prior to crystallization) may be larger in size than that desired. The amorphous material or ceramic can be, and typically is, converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are of the desired size may be recrushed if they are too large, or "recycled" and used as a raw material for re-melting if they are too small.

The shape of abrasive particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For abrasive particles an average aspect ratio ranging from 1:1 to 5:1 is typically desired, and in some embodiments 1.25:1 to 3:1, or even 1.5:1 to 2.5:1.

It is also within the scope of the present invention, for example, to directly form abrasive particles in desired shapes. For example, abrasive particles may be formed (including molded) by pouring or forming the melt into a mold.

It is also within the scope of the present invention, for example, to fabricate the ceramic comprising abrasive particles according to the present invention by coalescing. This coalescing step in essence forms a larger sized body from two or more smaller particles. For example, amorphous material comprising particles (obtained, for example, by crushing) (including beads and microspheres), fibers, etc. For example, abrasive particles according to the present invention, may also be provided by heating, for example, particles comprising the amorphous material, and/or fibers, etc. above the $T_g$ such that the particles, etc. coalesce to form a shape and cooling the coalesced shape. The temperature and pressure used for coalescing may depend, for example, upon composition of the amorphous material and the desired density of the resulting material. The temperature should below glass crystallization temperature, and for glasses, greater than the glass transition temperature. In certain embodiments, the heating is conducted at at least one temperature in a range of about 850° C. to about 1100° C. (in some embodiments, preferably 900° C. to 1000° C.). Typically, the amorphous material is under pressure (e.g., greater than zero to 1 GPa or more) during coalescence to aid the coalescence of the amorphous material. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressure, hot extrusion and the like. Typically, it is generally preferred to cool the resulting coalesced body before further heat treatment. After heat treatment if so desired, the coalesced body may be crushed to smaller particle sizes or a desired particle size distribution.

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material. Optionally, the resulting, coalesced article can be heat-treated to provide glass-ceramic, crystalline ceramic, or ceramic otherwise comprising crystalline ceramic.

Heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material is fed directly into a kiln operating at the elevated temperature. The time at the elevated temperature may range from a few seconds (in some embodiments even less than 5 seconds) to a few minutes to several hours. The temperature may range anywhere from 900° C. to 1600° C., typically between 1200° C. to 1500° C. It is also within the scope of the present invention to perform some of the heat-treatment in batches (e.g., for the nucleation step) and another continuously (e.g., for the crystal growth step and to achieve the desired density). For the nucleation step, the temperature typically ranges between about 900° C. to about 1100° C., in some embodiments, preferably in a range from about 925° C. to about 1050° C. Likewise for the density step, the temperature typically is in a range from about 1100° C. to about 1600° C., in some embodiments, preferably in a range from about 1200° C. to about 1500° C. This heat treatment may occur, for example, by feeding the material directly into a furnace at the elevated temperature. Alternatively, for example, the material may be feed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, hot-isostatic press, or in gas pressure furnace. It is within the scope of the present invention to convert (e.g., crush) the resulting article or heat-treated article to provide particles (e.g., abrasive particles).

The amorphous material is heat-treated to at least partially crystallize the amorphous material to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure of the present invention should be able to provide TTT curves for glasses according to the present invention, determine the appropriate nucleation and/or crystal growth conditions to provide crystalline ceramics, glass-ceramics, and ceramic comprising glass which comprise abrasive particles according to the present invention.

Typically, glass-ceramics are stronger than the amorphous material from which they are formed. Hence, the strength of the material may be adjusted, for example, by the degree to which the amorphous material is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, *Glass-Ceramics,* P. W. McMillan, Academic Press, Inc., $2^{nd}$ edition, 1979, the disclosure of which is incorporated herein by reference.

For example, during heat-treatment of some exemplary amorphous materials for making abrasive particles according to present invention, formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the amorphous material. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10–15 nanometers have been observed. Longer heat-treating temperatures typically lead to the growth of crystallites and progression of crystallization. For at least some embodiments, heat-treatment at about 1300° C. for about 1 hour provides a full crystallization. In generally, heat-treatment times for each of the nucleation and crystal growth steps may range of a few seconds (in some embodiments even less than 5 seconds) to several minutes to an hour or more.

Examples of crystalline phases which may be present in embodiments of abrasive particles according to the present invention include: $Al_2O_3$ (e.g., $\alpha$-$Al_2O_3$), $Y_2O_3$, REO, $HfO_2$, $ZrO_2$ (e.g., cubic $ZrO_2$ and tetragonal $ZrO_2$), BaO, CaO, $Cr_2O_3$, CoO, $Fe_2O_3$, $GeO_2$, $Li_2O$, MgO, MnO, NiO, $Na_2O$, $P_2O_5$, $Sc_2O_3$, $SiO_2$, SrO, $TeO_2$, $TiO_2$, $V_2O_3$, $Y_2O_3$, ZnO, "complex metal oxides" (including "complex $Al_2O_3$.metal oxide (e.g., complex $Al_2O_3$.REO (e.g., $ReAlO_3$ (e.g., $GdAlO_3$ $LaAlO_3$), $ReAl_{11}O_{18}$ (e.g., $LaAl_{11}O_{18}$), and $Re_3Al_5O_{12}$ (e.g., $Dy_3Al_5O_{12}$)), complex $Al_2O_3.Y_2O_3$ (e.g., $Y_3Al_5O_{12}$), and complex $ZrO_2$.REO (e.g., $La_2Zr_2O_7$)), and combinations thereof.

It is also with in the scope of the present invention to substitute a portion of the yttrium and/or aluminum cations in a complex $Al_2O_3$.metal oxide (e.g., complex $Al_2O_3.Y_2O_3$ (e.g., yttrium aluminate exhibiting a garnet crystal structure)) with other cations. For example, a portion of the Al cations in a complex $Al_2O_3.Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3.Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Similarly, it is also within the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

It is also with in the scope of the present invention to substitute a portion of the rare earth and/or aluminum cations in a complex $Al_2O_3$.metal oxide (e.g., complex $Al_2O_3$.REO) with other cations. For example, a portion of the Al cations in a complex $Al_2O_3$.REO may be substituted with at least one cation of an element selected from the group consisting of: Cr, Ti, Sc, Fe, Mg, Ca, Si, Co, and combinations thereof. For example, a portion of the Y cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as the JEOL SEM Model JSM 840A). A typical back-scattered electron (BSE) micrograph of the microstructure found in the sample is used to determine the average crystal size as follows. The number of crystals that intersect per unit length ($N_L$) of a random straight line drawn across the micrograph are counted. The average crystal size is determined from this number using the following equation.

$$\text{Average Crystal Size} = \frac{1.5}{N_L M}$$

Where $N_L$ is the number of crystals intersected per unit length and M is the magnification of the micrograph.

In some embodiments, abrasive particles according to the present invention comprise at least 75, 80, 85, 90, 95, 97, 98, 99, or even 100 percent by volume crystallites, wherein the crystallites have an average size not greater than 1 micrometer. In some embodiments, abrasive particles according to the present invention comprise less than at least 75, 80, 85, 90, 95, 97, 98, 99, or even 100 percent by volume crystallites, wherein the crystallites have an average size not greater than 0.5 micrometer. In some embodiments, ceramics (including glass-ceramics) comprising abrasive particles according to the present invention comprise less than at 75, 80, 85, 90, 95, 97, 98, 99, or even 100 percent by volume crystallites, wherein the crystallites have an average size not greater than 0.3 micrometer. In some embodiments, ceramics (including glass-ceramics) comprising abrasive particles according to the present invention comprise less than at least 75, 80, 85, 90, 95, 97, 98, 99, or even 100 percent by volume crystallites, wherein the crystallites have an average size not greater than 0.15 micrometer.

In some embodiments, the (true) density, sometimes referred to as specific gravity, of abrasive particles according to the present invention is preferably at least 92%, 95%, 96%, 97%, 98%, 99%, 99.5% or 100% of theoretical density.

The average hardness of the material of the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference.

Abrasive particles according to the present invention have an average hardness of at least 15 GPa, in some embodiments, at least 16 GPa, at least 17 GPa, or even at least 18 GPa.

Additional details regarding amorphous materials (including ceramics comprising amorphous material) and glass-ceramics, including making, using, and properties, can be found in application having U.S. Ser. Nos. 09/922,526, 09/922,527, and 09/922,530, filed Aug. 2, 2001, and U.S. Ser. No. 10/211, 630; 10/211,639; 10/211034; 10/211,044; 10/211,628, and 10/211,640, filed the same date as the instant application, the disclosures of which are incorporated herein by reference.

Abrasive particles according to the present invention generally comprise crystalline ceramic (e.g., at least 75, 80, 85, 90, 91, 92, 93, 94, 95, 96, 97, 98, 99, 99.5, or even 100 percent by volume) crystalline ceramic.

Abrasive particles according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles according to the present invention may be used in a wide range of particle sizes, typically ranging in size from about 0.1 to about 5000 micrometers, more typically from about 1 to about 2000 micrometers; desirably from about 5 to about 1500 micrometers, more desirably from about 100 to about 1500 micrometers.

ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Preferred ANSI grades comprising abrasive particles according to the present invention are ANSI 8–220. FEPA grade designations include P8, P12, P16, P24, P36, P40, P50, P60, P80, P100, P120, P150, P180, P220, P320, P400, P500, P600, P800, P1000, and P1200. Preferred FEPA grades comprising abrasive particles according to the present invention are P12–P220. JIS grade designations include JIS8, JIS 12, JIS 16, JIS24, JIS36, JIS46, JIS54, JIS60, JIS80, JIS 100, JIS150, JIS180, JIS220, JIS240, JIS280, JIS 320, JIS360, JIS400, JIS600, JIS 800, JIS 1000, JIS1500, JIS2500, JIS4000, JIS6000, JIS 8000, and JIS 10,000. Preferred JIS grades comprising abrasive particles according to the present invention are JIS8–220.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form amorphous material. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating amorphous (e.g., glass) comprising particles such that at least a portion of the amorphous material is converted to a glass-ceramic to provide abrasive particles comprising the glass-ceramic comprising alpha alumina having an average crystal size not greater than 150 nanometers, wherein at least 90 (in some embodiments preferably, 95, or even 100) percent by number of the alpha alumina present in such portion have crystal sizes greater than 200 nanometers. The present invention also provides a method for making abrasive particles comprising alpha alumina having average crystal size greater than 150 nanometers, wherein at least 90 (in some embodiments preferably, 95, or even 100) percent by number of the alpha alumina present in such portion have crystal sizes greater than 200 nanometers, the method comprising heat-treating amorphous material such that at least a portion of the amorphous material is converted to a glass-ceramic, and crushing the resulting heat-treated material to provide the abrasive particles. When crushed, amorphous material tends to provide sharper particles than crushing significantly crystallized glass-ceramics or crystalline material.

In another aspect, the present invention provides agglomerate abrasive grains each comprise a plurality of abrasive particles according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) according to the present invention. Methods of making such abrasive articles and using abrasive articles are well known to those skilled in the art. Furthermore, abrasive particles according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

An example of a coated abrasive article according to the present invention is depicted in FIG. 1. Referring to this figure, coated abrasive article according to the present invention 1 has a backing (substrate) 2 and abrasive layer 3. Abrasive layer 3 includes abrasive particles according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3–50% by volume bond material, about 30–90% by volume abrasive particles (or abrasive particle blends), up to 50% by volume additives (including grinding aids), and up to 70% by volume pores, based on the total volume of the bonded abrasive article.

Figure 2:
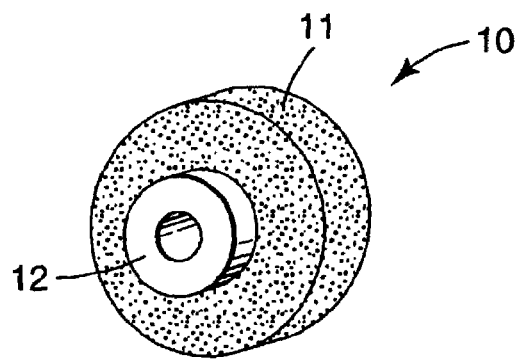
FIG. 2 is a perspective view of a bonded abrasive article including abrasive particles according to the present invention.

A preferred form is a grinding wheel. Referring to FIG. 2, grinding wheel according to the present invention 10 is depicted, which includes abrasive particles according to the present invention 11, molded in a wheel and mounted on hub 12.

Figure 3:
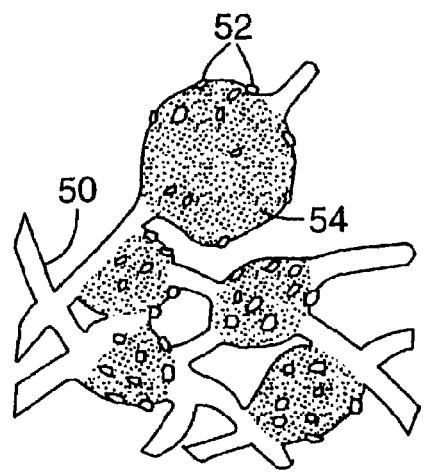
FIG. 3 is an enlarged schematic view of a nonwoven abrasive article including abrasive particles according to the present invention.

Nonwoven abrasive articles typically include an open porous lofty polymer filament structure having abrasive particles according to the present invention distributed throughout the structure and adherently bonded therein by an organic binder. Examples of filaments include polyester fibers, polyamide fibers, and polyaramid fibers. In FIG. 3, a schematic depiction, enlarged about 100 ×, of a typical nonwoven abrasive article according to the present invention is provided. Such a nonwoven abrasive article according to the present invention comprises fibrous mat 50 as a substrate, onto which abrasive particles according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751, 138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present invention may be in the shape of a wheel (including cut off wheels), honing stone, mounted pointed or other conventional bonded abrasive shape. A preferred vitrified bonded abrasive article according to the present invention is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass fit. The remaining portion of the vitreous bonding material can be a non-frit material. Alternatively, the vitreous bond may be derived from a non-fit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

Preferred vitrified bonding materials may include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50–300 $g/m^2$ (desirably, about 80–160 $g/m^2$). In vitrified bonded abrasive articles grinding aid is typically impregnated into the pores of the article.

The abrasive articles can contain 100% abrasive particles according to the present invention, or blends of such abrasive particles with other abrasive particles and/or diluent particles. However, at least about 2% by weight, desirably at least about 5% by weight, and more desirably about 30–100% by weight, of the abrasive particles in the abrasive articles should be abrasive particles according to the present invention. In some instances, the abrasive particles according the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.), U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et al.), U.S. Pat. No. 5,143,522 (Gibson et al.), and U.S. Pat. No. 5,336,280 (Dubots et al.), and applications having U.S. Ser. Nos. 09/495,978, 09/496,422, 09/496,638, and 09/496,713, each filed on Feb. 2, 2000, and, U.S. Ser. Nos. 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000, and U.S. Ser. No. 09/772,730, filed Jan. 30, 2001, the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present invention, with the smaller sized particles being another abrasive particle type. Conversely, for example, the smaller sized abrasive particles may be abrasive particles according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2000, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles according to the present invention, and the second (outermost) layer comprises abrasive particles according to the present invention. Likewise in a bonded abrasive, there may be two distinct sections of the grinding wheel. The outermost section may comprise abrasive particles according to the present invention, whereas the innermost section does not. Alternatively, abrasive particles according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5, 609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianson), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800, 685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.) the disclosures of which are incorporated herein by reference. Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

The present invention provides a method of abrading a surface, the method comprising contacting at least one abrasive particle according to the present invention, with a surface of a workpiece; and moving at least of one the abrasive particle or the contacted surface to abrade at least a portion of said surface with the abrasive particle. Methods for abrading with abrasive particles according to the present invention range of snagging (i.e., high pressure high stock removal) to polishing (e.g., polishing medical implants with coated abrasive belts), wherein the latter is typically done with finer grades (e.g., less ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles according to the present invention may be used to abrade workpieces such as aluminum metal, carbon steels, mild steels, tool steels, stainless steel, hardened steel, titanium, glass, ceramics, wood, wood like materials, paint, painted surfaces, organic coated surfaces and the like. The applied force during abrading typically ranges from about 1 to about 100 kilograms.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLES

Examples 1–20

A 250-ml polyethylene bottle (7.3-cm diameter) was charged with a 50-gram mixture of various powders (as shown below in Table 1, with sources of the raw materials listed in Table 2), 75 grams of isopropyl alcohol, and 200 grams of alumina milling media (cylindrical shape, both height and diameter of 0.635 cm; 99.9% alumina; obtained from Coors, Golden, Colo.). The contents of the polyethylene bottle were milled for 16 hours at 60 revolutions per minute (rpm). After the milling, the milling media were removed and the slurry was poured onto a warm (approximately 75° C.) glass ("PYREX") pan and dried. The dried mixture was screened through a 70-mesh screen (212-micrometer opening size) with the aid of a paint brush.

After grinding and screening, the mixture of milled feed particles was fed slowly (0.5 gram/minute) into a hydrogen/oxygen torch flame to melt the particles. The torch used to melt the particles, thereby generating molten droplets, was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The dried and sized particles were fed slowly (0.5 gram/minute) into the torch flame which melted the particles and carried them into a 19-liter (5-gallon) cylindrical container (30 cm diameter by 34 cm height) of continuously circulating, turbulent water to rapidly quench the molten droplets. The angle at which the flame hit the water was approximately 45°, and the flame length, burner to water surface, was approximately 18 centimeters (cm). The resulting molten and rapidly quenched particles were collected and dried at 110° C. The particles were spherical in shape and varied in size from a few micrometers (i.e., microns) up to 250 micrometers.

A percent amorphous yield was calculated from the resulting flame-formed beads using a −100+120 mesh size fraction (i.e., the fraction collected between 150-micrometer opening size and 125-micrometer opening size screens). The measurements were done in the following manner. A single layer of beads was spread out upon a glass slide. The beads were observed using an optical microscope. Using the crosshairs in the optical microscope eyepiece as a guide, beads that lay along a straight line were counted either amorphous or crystalline depending on their optical clarity. A total of 500 beads were counted and a percent amorphous yield was determined by the amount of amorphous beads divided by total beads counted.

Materials prepared in Examples 12 through 20 were amorphous as determined by visual inspection, but the quantitative analysis according to the above procedure was not performed. Amorphous material is typically transparent due to the lack of light scattering centers such as crystal boundaries, while the crystalline particles show a crystalline structure and are opaque due to light scattering effects.

The phase composition (glassy/amorphous/crystalline) was determined through Differential Thermal Analysis (DTA) -as described below. The material was classified as amorphous if the corresponding DTA trace of the material contained an exothermic crystallization event ($T_x$). If the same trace also contained an endothermic event ($T_g$) at a temperature lower than $T_x$ it was considered to consist of a glass phase. If the DTA trace of the material contained no such events, it was considered to contain crystalline phases.

Differential thermal analysis (DTA) was conducted using the following method. DTA runs were made (using an instrument obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). The amount of each screened sample placed in a 100-microliter $AL_2O_3$ sample holder was about 400 milligrams. Each sample was heated in static air at a rate of 10° C./minute from room temperature (about 25° C.) to 1100° C.

Figure 4:
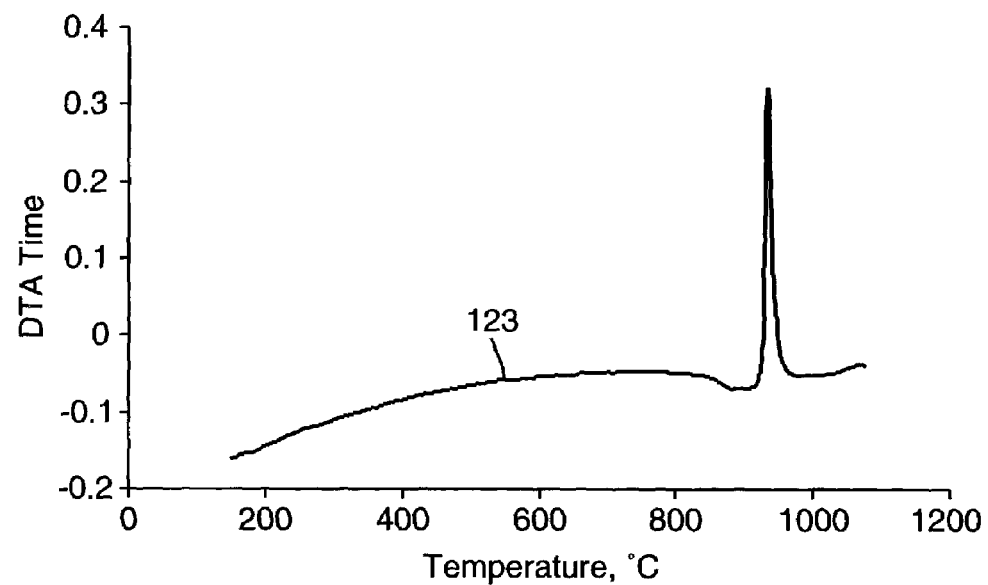
FIG. 4 is a DTA of the material prepared in Example 1.

Referring to FIG. 4, line 123 is the plotted DTA data for the Example 1 material. Referring to FIG. 4, line 123, the material exhibited an endothermic event at temperature around 872° C., as evidenced by the downward curve of line 123. It is believed this event was due to the glass transition ($T_g$) of the glass material. At about 958° C., an exothermic event was observed as evidenced by the sharp peak in line 123. It is believed that this event was due to the crystallization ($T_x$) of the material. These $T_g$ and $T_x$ values for other examples, except for Examples 15–20, are reported in Table 1 below.

TABLE 1

| Example | Batch amounts, g | Weight percent of components | Final weight percent alumina % | Percent final alumina from Al metal | Percent amorphous yield | Glass transition/ crystallization temperatures |
|---|---|---|---|---|---|---|
| Ex. 1 ALZ | $Al_2O_3$: 19.3 $La_2O_3$: 21.3 $ZrO_2$: 9.5 | $Al_2O_3$: 38.5 $La_2O_3$: 42.5 $ZrO_2$: 19.0 | 38.5 | 0 | 98 | 882° C. 932° C. |
| Ex. 2 AYZ | $Al_2O_3$: 16.7 Al: 8.8 $Y_2O_3$: 16 $ZrO_2$: 8.6 | $Al_2O_3$: 33.3 Al: 17.6 $Y_2O_3$: 31.9 $ZrO_2$: 17.2 | 57.5 | 50 | 89 | 900° C. 935° C. |
| Ex. 3 AGdZ | $Al_2O_3$: 20.5 $Gd_2O_3$: 20.5 $ZrO_2$: 9 | $Al_2O_3$: 41.0 $Gd_2O_3$: 41.0 $ZrO_2$: 18 | 41.0 | 0 | 94 | 872° C. |
| Ex. 4 AY | $Al_2O_3$: 19.5 Al: 10.3 $Y_2O_3$: 20.1 | $Al_2O_3$: 39.1 Al: 20.7 $Y_2O_3$: 40.3 | 66 | 50 | 93 | 894° C. 943° C. |

TABLE 1-continued

| Example | Batch amounts, g | Weight percent of components | Final weight percent alumina % | Percent final alumina from Al metal | Percent amorphous yield | Glass transition/ crystallization temperatures |
|---|---|---|---|---|---|---|
| Ex. 5 AYMg | $Al_2O_3$: 18.8<br>Al: 10.0<br>MgO: 0.0<br>Mg: 1.8<br>$Y_2O_3$: 19.4 | $Al_2O_3$: 37.7<br>Al: 19.9<br>MgO: 0.0<br>Mg: 3.6<br>$Y_2O_3$: 38.8 | 62.7 | 50 | 93 | 848° C.<br>996° C. |
| Ex. 6 AYMg | $Al_2O_3$: 18.1<br>Al: 9.6<br>MgO: 0.0<br>Mg: 3.7<br>$Y_2O_3$: 18.6 | $Al_2O_3$: 36.2<br>Al: 19.2<br>MgO: 0.0<br>Mg: 7.3<br>$Y_2O_3$: 37.3 | 59.4 | 50 | 81 | 832° C.<br>884° C. |
| Ex. 7 AZ | $Al_2O_3$: 17.0<br>Al: 9.0<br>$ZrO_2$: 24.1 | $Al_2O_3$: 33.9<br>Al: 18.0<br>$ZrO_2$: 48.1 | 58.5 | 50 | 63 | none<br>959° C. |
| Ex. 8 AZ-Ti | $Al_2O_3$: 15.5<br>Al: 8.2<br>$ZrO_2$: 22.0<br>$TiO_2$: 4.3 | $Al_2O_3$: 31.0<br>Al: 16.4<br>$ZrO_2$: 44.0<br>$TiO_2$: 8.6 | 54 | 50 | 79 | none<br>936° C. |
| Ex. 9 AZ-La | $Al_2O_3$: 12.3<br>Al: 6.5<br>$ZrO_2$: 17.4<br>$La_2O_3$: 13.8 | $Al_2O_3$: 24.5<br>Al: 13.0<br>$ZrO_2$: 34.8<br>$La_2O_3$: 27.7 | 44 | 50 | 94 | 889° C.<br>918° C. |
| Ex. 10 AZ-La | $Al_2O_3$: 9.1<br>Al: 4.8<br>$ZrO_2$: 13.0<br>$La_2O_3$: 23.1 | $Al_2O_3$: 18.2<br>Al: 9.6<br>$ZrO_2$: 25.9<br>$La_2O_3$: 46.2 | 34 | 50 | 96 | 868° C.<br>907° C. |
| Ex. 11 AZ-La | $Al_2O_3$: 7.5<br>Al: 4.0<br>$ZrO_2$: 17.0<br>$La_2O_3$: 21.4 | $Al_2O_3$: 15.0<br>Al: 8.0<br>$ZrO_2$: 34.0<br>$La_2O_3$: 42.8 | 28 | 50 | 93 | 870° C.<br>898° C. |
| Ex. 12 ACZ | $Al_2O_3$: 20.3<br>$ZrO_2$: 9.0<br>$La_2O_3$: 20.7 | $Al_2O_3$: 40.6<br>$ZrO_2$: 18.0<br>$La_2O_3$: 41.4 | 40.6 | 0 | NA | 838° C.<br>908° C. |
| Ex. 13 ALZ/ $CaF_2$ | $Al_2O_3$: 15.6<br>$La_2O_3$: 17<br>$ZrO_2$: 7.4<br>$CaF_2$: 10 | $Al_2O_3$: 31.2<br>$La_2O_3$: 34<br>$ZrO2$: 14.8<br>$CaF2$: 20 | 37.04 | 0 | NA | none<br>676° C. |
| Ex. 14 ALZ/ $P_2O_5$ | $Al_2O_3$: 17.87<br>$La_2O_3$: 21.08<br>$ZrO_2$: 8.55<br>$P_2O_5$: 2.5 | $Al_2O_3$: 35.73<br>$La_2O_3$: 42.17<br>$ZrO_2$: 17.1<br>$P_2O_5$: 5 | 35.73 | 0 | NA | 857° C.<br>932° C. |
| Ex. 15 ALZ/ $Nb_2O_5$ | $Al_2O_3$: 17.87<br>$La_2O_3$: 21.08<br>$ZrO_2$: 8.55<br>$Nb_2O_5$: 2.5 | $Al_2O_3$: 35.73<br>$La_2O_3$: 42.17<br>$ZrO_2$: 17.1<br>$Nb_2O_5$: 5 | 35.73 | 0 | NA | NA |
| Ex. 16 ALZ/ $Ta_2O_5$ | $Al_2O_3$: 17.87<br>$La_2O_3$: 21.08<br>$ZrO_2$: 8.55<br>$Ta_2O_5$: 2.5 | $Al_2O_3$: 35.73<br>$La_2O_3$: 42.17<br>$ZrO_2$: 17.1<br>$Ta_2O_5$: 5 | 35.73 | 0 | NA | NA |
| Ex. 17 ALZ/ SrO | $Al_2O_3$: 17.87<br>$La_2O_3$: 21.08<br>$ZrO_2$: 8.55<br>SrO: 2.5 | $Al_2O_3$: 35.73<br>$La_2O_3$: 42.17<br>$ZrO_2$: 17.1<br>SrO: 5 | 35.73 | 0 | NA | NA |
| Ex. 18 ALZ/ $Mn_2O_3$ | $Al_2O_3$: 17.87<br>$La_2O_3$: 21.08<br>$ZrO_2$: 8.55<br>$Mn_2O_3$: 2.5 | $Al_2O_3$: 35.73<br>$La_2O_3$: 42.17<br>$ZrO_2$: 17.1<br>$Mn_2O_3$: 5 | 35.73 | 0 | NA | NA |
| Ex. 19 ALZ/ $Fe_2O_3$ | $Al_2O_3$: 18.25<br>$La_2O_3$: 21.52<br>$ZrO_2$: 8.73<br>$Fe_2O_3$: 1.5 | $Al_2O_3$: 36.5<br>$La_2O_3$: 43.04<br>$ZrO_2$: 17.46<br>$Fe_2O_3$: 3 | 36.5 | 0 | NA | NA |
| Ex. 20 ALZ/ $Cr_2O_3$ | $Al_2O_3$: 18.25<br>$La_2O_3$: 21.52<br>$ZrO_2$: 8.73<br>$Cr_2O_3$: 1.5 | $Al_2O_3$: 36.5<br>$La_2O_3$: 43.04<br>$ZrO_2$: 17.46<br>$Cr_2O_3$: 3 | 36.5 | 0 | NA | NA |

TABLE 2

| Raw Material | Source |
| --- | --- |
| Alumina particles ($Al_2O_3$) | Obtained from Alcoa Industrial Chemicals, Bauxite, AR, under the trade designation "Al6SG" |
| Aluminum particles (Al) | Obtained from Alfa Aesar, Ward Hill, MA |
| Cerium oxide particles | Obtained from Rhone-Poulence, France |
| Gadolinium oxide particles | Obtained from Molycorp Inc., Mountain Pass, CA |
| Lanthanum oxide particles ($La_2O_3$) | Obtained from Molycorp Inc., Mountain Pass, CA and calcined at 700° C. for 6 hours prior to batch mixing. |
| Magnesium particles (Mg) | Obtained from Alfa Aesar, Ward Hill, MA |
| Magnesium oxide particles (MgO) | Obtained from BDH Chemicals Ltd, Poole, England |
| Titanium oxide particles ($TiO_2$) | Obtained from Kemira, Savannah, GA, under the trade designation "Unitane 0-110" |
| Yttrium oxide particles ($Y_2O_3$) | Obtained from H.C. Stark Newton, MA |
| Zirconium oxide particles ($ZrO_2$) | Obtained from Zirconia Sales, Inc. of Marietta, GA under the trade designation "DK-2" |
| Calcium fluoride particles ($CaF_2$) | Obtained from Aldrich, Milwaukee, WI |
| Phosphorous oxide particles ($P_2O_5$) | Obtained from Aldrich, Milwaukee, WI |
| Niobium oxide particles ($Nb_2O_5$) | Obtained from Aldrich, Milwaukee, WI |
| Tantalum oxide particles ($Ta_2O_5$) | Obtained from Aldrich, Milwaukee, WI |
| Strontium oxide particles (SrO) | Obtained from Aldrich, Milwaukee, WI |
| Manganese oxide particles ($Mn_2O_3$) | Obtained from Aldrich, Milwaukee, WI |
| Iron oxide particles ($Fe_2O_3$) | Obtained from Aldrich, Milwaukee, WI |
| Chromium oxide particles ($Cr_2O_3$) | Obtained from Aldrich, Milwaukee, WI |

Example 21

About 25 grams of the beads from Example 1 were placed in a graphite die and hot-pressed using uniaxial pressing apparatus (obtained under the trade designation "HP-50", Thermal Technology Inc., Brea, Calif.). The hot-pressing was carried out in an argon atmosphere and 13.8 megapascals (MPa) (2000 pounds per square inch or 2 ksi) pressure. The hot-pressing furnace was ramped up to 970° C., at 25° C./minute. The result was a disc, 3.4 cm in diameter and 0.6 cm thick, of transparent bulk material. A DTA trace was conducted as described in Example 1–20. The trace exhibited an endothermic event at temperature around 885° C., as evidenced by the downward change in the curve of the trace. It is believed this event was due to the glass transition ($T_g$) of the glass material. The same material exhibited an exothermic event at a temperature around 928° C., as evidenced by the sharp peak in the trace. It is believed that this event was due to the crystallization ($T_x$) of the material.

Example 22

A 250-ml polyethylene bottle (7.3-cm diameter) was charged with the following 50-gram mixture: 19.3 grams of alumina particles (obtained from Alcoa Industrial Chemicals, Bauxite, Ark., under the trade designation "Al6SG"), 9.5 grams of zirconium oxide particles (obtained from Zirconia Sales, Inc. of Marietta, Ga. under the trade designation "DK-2"), and 21.2 grams of lanthanum oxide particles (obtained from Molycorp Inc., Mountain Pass, Calif.), 75 grams of isopropyl alcohol, and 200 grams of alumina milling media (cylindrical in shape, both height and diameter of 0.635 cm; 99.9% alumina; obtained from Coors, Golden, Colo.). The contents of the polyethylene bottle were milled for 16 hours at 60 revolutions per minute (rpm). The ratio of alumina to zirconia in the starting material was 2:1, and the alumina and zirconia collectively made up about 58 weight percent (wt-%). After the milling, the milling media were removed and the slurry was poured onto a warm (approximately 75° C.) glass ("PYREX") pan and dried. The dried mixture was screened through a 70-mesh screen (212-micrometer opening size) with the aid of a paint brush.

After grinding and screening, the mixture of milled feed particles was fed slowly (0.5 gram/minute) into a hydrogen/oxygen torch flame to melt the particles. The torch used to melt the particles, thereby generating molten droplets, was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The dried and sized particles were fed slowly (0.5 gram/minute) into the torch flame, which melted the particles and carried them on to an inclined stainless steel surface (approximately 51 centimeters (20 inches) wide with a slope angle of 45 degrees) with cold water running over (approximately 8 liters/minute) the surface to rapidly quench the molten droplets. The resulting molten and quenched beads were collected and dried at 110° C. The particles were spherical in shape and varied in size from a few micrometers (i.e., microns) up to 250 micrometers.

Subsequently, the flame-formed beads having diameters less than 125 micrometers were then passed through a plasma gun and deposited on stainless steel substrates as follows.

Four 304 stainless steel substrates (76.2 millimeter (mm)×25.4mm×3.175 mm dimensions), and two 1080 carbon steel substrates (76.2 mm×25.4 mm×1.15 mm) were prepared in the following manner. The sides to be coated were sandblasted, washed in an ultrasonic bath, and then wiped clean with isopropyl alcohol. Four stainless steel and one 1080 carbon steel substrates were placed approximately 10 centimeters (cm) in front of the nozzle of a plasma gun (obtained under the trade designation "Praxair SG-100 Plasma Gun" from Praxair Surface Technologies, Concord, NH). The second 1080 carbon steel was placed 18 cm in front of the nozzle of the plasma gun. The coatings made on the second 1080 carbon steel samples at a distance of 18 cm in front of the nozzle of the plasma gun were not further characterized.

The plasma unit had a power rating of 40 kW. The plasma gas was argon (50 pounds per square inch (psi), 0.3 megapascal (MPa)) with helium as the auxiliary gas (150 psi, 1 MPa). The beads were passed through the plasma gun by using argon as the carrier gas (50 psi, 0.3 MPa) using a Praxair Model 1270 computerized powder feeder (obtained from Praxair Surface Technologies, Concord, N.H.). During deposition, a potential of about 40 volts and a current of about 900 amperes was applied and the plasma gun was panned left to right, up and down, to evenly coat the substrates. When the desired thickness was achieved, the plasma spray was shut off and the samples were recovered. The 1080 carbon steel substrate was flexed, thus separating the coating from the substrate resulting in a free-standing bulk material. The deposited material had a z dimension (thickness) of about 1350 micrometers, as determined using optical microscopy.

The phase composition (glassy/amorphous/crystalline) was determined through Differential Thermal Analysis (DTA) as described below. The material was classified as amorphous if the corresponding DTA trace of the material contained an exothermic crystallization event ($T_x$). If the same trace also contained an endothermic event ($T_g$) at a temperature lower than $T_x$ it was considered to consist of a glass phase. If the DTA trace of the material contained no such events, it was considered to contain crystalline phases.

Differential thermal analysis (DTA) was conducted using the following method. DTA runs were made (using an instrument obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). The amount of each screened sample placed in a 100-microliter $Al_2O_3$ sample holder was about 400 milligrams. Each sample was heated in static air at a rate of 10° C./minute from room temperature (about 25° C.) to 1100° C.

The coated material (on 304 stainless steel substrates) exhibited an endothermic event at a temperature around 880° C., as evidenced by a downward change in the curve of the trace. It is believed this event was due to the glass transition ($T_g$) of the glass material. The same material exhibited an exothermic event at a temperature around 931° C., as evidenced by a sharp peak in the trace. It is believed that this event was due to the crystallization ($T_x$) of the material. Thus, the coated material (on 304 stainless steel substrates) and the free-standing bulk material were glassy as determined by a DTA trace.

A portion of the glassy free-standing bulk material was then heat-treated at 1300° C. for 48 hours. Powder X-ray diffraction, XRD, (using an X-ray diffractometer (obtained under the trade designation "PHLLIPS XRG 3100" from Phillips, Mahwah, N.J.) with copper K α1 radiation of 1.54050 Angstrom) was used to determine the phases present. The phases were determined by comparing the peaks present in the XRD trace of the crystallized material to XRD patterns of crystalline phases provided in JCPDS (Joint Committee on Powder Diffraction Standards) databases, published by International Center for Diffraction Data. The resulting crystalline material included $LaAlO_3$, $ZrO_2$ (cubic, tetragonal), $LaAl_{11}O_{18}$, and transitional $Al_2O_3$ phases.

Figure 5:
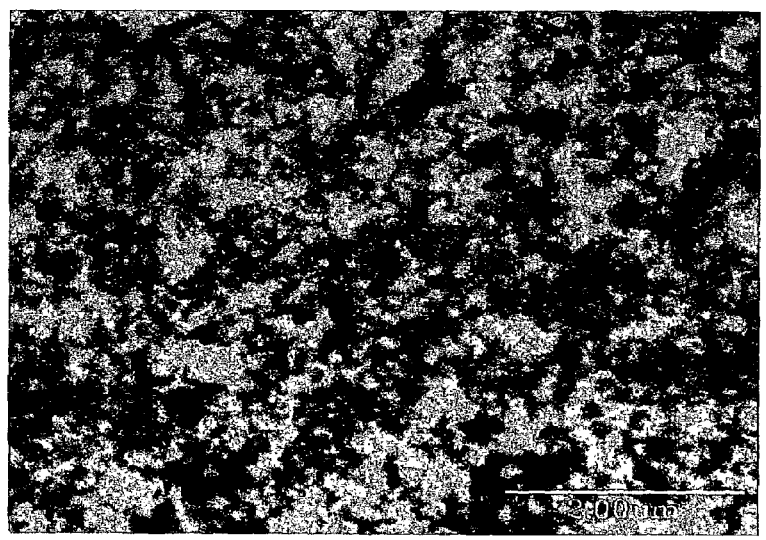
FIG. 5 is a Scanning Electron Micrograph (SEM) of fractured surface of material prepared in Example 22.

Another portion of the glassy free-standing bulk material was crystallized at 1300° C. for 1 hour in an electrically heated furnace (obtained from CM Furnaces, Bloomfield, N.J. under the trade designation "Rapid Temp Furnace"). The crystallized coating was crushed with a hammer into particles of −30+35 mesh size (i.e., the fraction collected between 600-micrometer opening size and 500-micrometer opening size screens). The particles were cleaned of debris by washing in a sonic bath (obtained from Cole-Parmer, Vernon Hills, Ill., under the trade designation "8891") for 15 minutes, dried at 100° C., and several were mounted on a metal cylinder (3 cm in diameter and 2 cm high) using carbon tape. The mounted sample was sputter coated with a thin layer of gold-palladium and viewed using a JEOL scanning electron microscopy (SEM) (Model JSM 840A). The fractured surface was rough and no crystals coarser than 200 nanometers (nm) were observed (FIG. 5) in the SEM.

Example 23

Feed particles were made as described in Example 22 using the following 50-gram mixture: 21.5 grams of alumina particles (obtained from Alcoa Industrial Chemicals, Bauxite, Ark. under the trade designation "A16SG"), 9 grams of zirconium oxide particles (obtained from Zirconia Sales, Inc. of Marietta, Ga. under the trade designation "DK-2"), and 19.5 grams of cerium oxide particles (obtained from Rhone-Poulence, France). The ratio of alumina to zirconia in the starting material was 2.4:1 and the alumina and zirconia collectively made up about 61 weight percent. Feed particles were flame-formed into beads (of a size that varied from a few micrometers up to 250 micrometers) as described in Example 22. Subsequently, the flame-formed beads having diameters between 180 micrometers and 250 micrometers were passed through a plasma gun and deposited on stainless and carbon steel substrates as described in Example 22.

The 1080 carbon steel substrates were flexed, thus separating the coating from the substrate resulting in a free-standing bulk material. The resulting bulk material had a z dimension (thickness) of about 700 micrometers, as determined using optical microscopy. The microstructure was also observed using optical microscopy. The material consisted of generally spherical and oblique crystalline particles, which were opaque, within a predominantly amorphous matrix, which was transparent. Amorphous material is typically transparent due to the lack of light scattering centers such as crystal boundaries, while the crystalline particles show a crystalline structure and are opaque due to light scattering effects. The crystalline phases, determined by powder XRD analysis as described in Example 22, consisted of $Zr_{0.4}Ce_{0.6}O_2$ (cubic) and transitional $Al_2O_3$.

A second deposition experiment was carried out using the flame-formed beads having diameters less than 125 micrometers. The resulting coating had a z dimension (thickness) of about 1100 micrometers, as determined using optical microscopy. The microstructure was also observed using optical microscopy. This material had similar features (i.e., consisted of generally spherical and oblique crystalline particles within a predominantly amorphous matrix) to those of the material formed from beads having diameters between 180 micrometers and 250 micrometers. The crystalline phases, determined by XRD analysis as described in Example 22, consisted of $Zr_{0.4}Ce_{0.6}O_2$ (cubic) and transitional $Al_2O_3$.

The average hardness of the as-sprayed material of this example was determined as follows. Sections of the material were mounted in mounting resin (obtained under the trade designation "TRANSOPTIC POWDER" from Buehler, Lake Bluff, Ill.). The resulting cylinder of resin was about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries. The microhardness measurements were made using a conventional microhardness tester (obtained under the trade designation "MITUTOYO MVK-VL" from Mitutoyo Corporation, Tokyo, Japan) fitted with a Vickers indenter using a 100-gram indent load. The microhardness measurements were made according to the guidelines stated in ASTM Test Method E384 Test Methods for Microhardness of Materials (1991), the disclosure of which is incorporated herein by reference. The average microhardness (an average of 20 measurements) of the material of this example was 15 gigapascals (Gpa).

Example 24

Feed particles were made as described in Example 22 using the following 50-gram mixture: 27.9 grams of alumina particles (obtained from Alcoa Industrial Chemicals, Bauxite, Ark. under the trade designation "Al6SG"), 7.8 grams of zirconium oxide particles (obtained from Zirconia Sales, Inc. of Marietta, Ga. under the trade designation "DK-2"), and 14.3 grams of yttrium oxide particles (obtained from H. C. Stark Newton, Mass.). The ratio of alumina to zirconia of initial starting materials was 3.5:1 and the alumina and zirconia collectively made up about 72 weight percent. The feed particles were then screened through a 30-mesh screen (600-micrometer opening size) and heat-treated at 1400° C. for 2 hours in an electrically heated furnace (obtained from CM Furnaces, Bloomfield, N.J. under the trade designation "Rapid Temp Furnace"). The heat-treated particles were further screened to separate out particles with diameters between 125 micrometers and 180 micrometers, which were then passed through a plasma gun and deposited on stainless steel substrates as described in Example 22.

The 1080 carbon steel substrate was flexed, thus separating the coating from the substrate resulting in a free-standing bulk material. The resulting bulk material had a z dimension (thickness) of about 700 micrometers, as determined using optical microscopy. The microstructure was observed using optical microscopy. This material consisted of generally crystalline opaque particles (which retained their original shapes) within a predominantly transparent, amorphous matrix. The crystalline phases, determined by powder XRD analysis as described in Example 22, consisted of $Al_5Y_3O_{12}$ and $Y_{0.15}Zr_{0.85}O_{1.93}$.

Figure 6:
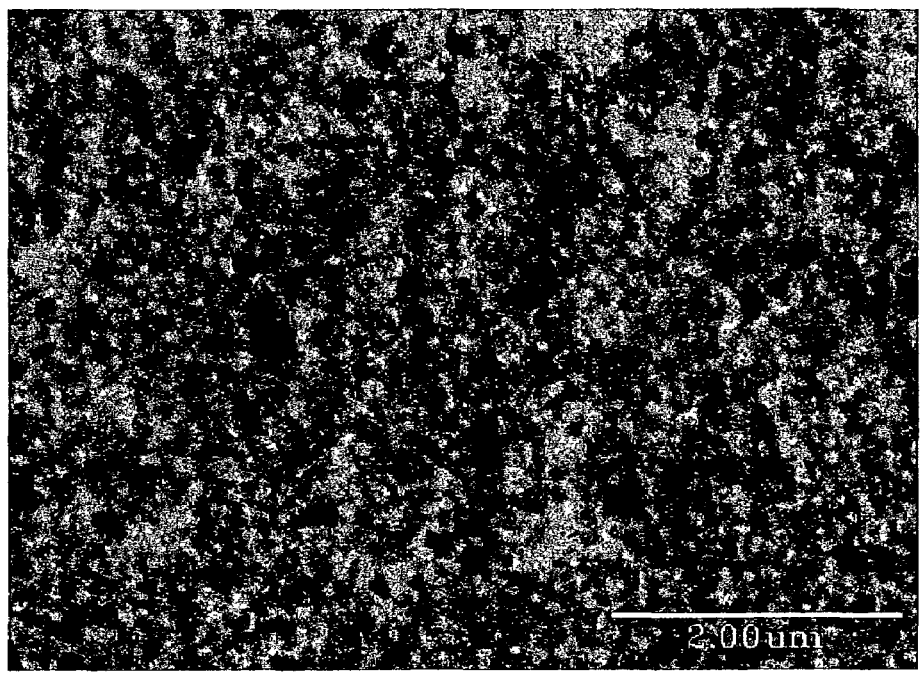
FIG. 6 is a Scanning Electron Micrograph (SEM) of fractured surface of material prepared in Example 24.

Another portion of the free-standing bulk material was crystallized at 1300° C. for 1 hour and the fractured surface was sputter coated with a thin layer of gold-palladium and viewed using a JEOL SEM (Model JSM 840A), as described above in Example 22. The fractured surface was rough and no crystals coarser than 200 nm were observed (FIG. 6).

A second deposition experiment was carried out using heat-treated particles having diameters less than 125 micrometers. The resulting coating was about 1500 micrometers thick (z dimension). The microstructure was observed using optical microscopy. This material had similar features (consisted of generally opaque, crystalline particles (which retained their original shapes) within a predominantly transparent, amorphous matrix) to the material formed from beads having diameters between 180 micrometers and 250 micrometers. The crystalline phases, determined by XRD analysis as described in Example 22, consisted of $Al_5Y_3O_{12}$ and $Y_{0.15}Zr_{0.85}O_{1.93}$.

Example 25

A thick coating consisting of various layers of the above three examples was plasma sprayed using feed particles produced in Examples 22–24. The first layer was coated as described in Example 23, the second as described in Example 22, and the third as described in Example 24.

The substrate was not sandblasted prior to coating so that it was removed easily by plying it apart by hand, resulting in a free-standing bulk material, approximately 75 millimeters (mm)×25 mm×7.5 mm. A cross-section, cutting through each layer, was sectioned from the material using a diamond saw. The sectioned piece was mounted in mounting resin (obtained under the trade designation "TRANSOPTIC POWDER" from Buehler, Lake Bluff, Ill.) such that the different layers were visible. The resulting cylinder of resin was about 2.5 cm in diameter and about 1.9 cm tall (i.e., high). The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries.

The first layer had a z dimension (thickness) of approximately 2.5 mm, as determined using optical microscopy. The microstructure was observed using optical microscopy. This material had similar features to those of the material of Example 23 (i.e., consisted of generally spherical and opaque crystalline particles within a predominantly transparent, amorphous matrix). The second layer had a z dimension (thickness) of approximately 2 mm, as determined using optical microscopy. The microstructure was also observed using optical microscopy. This material had similar features to those of the material of Example 22 (i.e., was transparent suggesting it was amorphous). The third layer had a z dimension (thickness) of approximately 3 mm, as determined using optical microscopy. The microstructure was also observed using optical microscopy. This material had similar features to those of the material of Example 24 (i.e., it consisted of generally opaque crystalline particles (which retained their original shapes) within a predominantly transparent, amorphous matrix).

Example 26

The consolidated material produced in Example 21 was crushed by using a "Chipmunk" jaw crusher (Type VD, manufactured by BICO Inc., Burbank, Calif.) into abrasive particles and graded to retain the –30+35 mesh fraction (i.e., the fraction collected between 600-micrometer opening size and 500-micrometer opening size screens) and the –35+40 mesh fraction (i.e., the fraction collected between 500-micrometer opening size and 425-micrometer opening size screens). The two mesh fractions were combined to provide a 50/50 blend.

An average aspect ratio of the particles was measured using a Zeiss Image Analysis System (Zeiss Stemi SV 11 microscope and software loaded on a computer) and a video camera (3 CCD camera, model 330, (obtained from Dage MTI Inc., Mich. City, Ind.)). The resulting aspect ratio was 1.86.

Density of the particles was measured using a gas pychometer AccuPyc 1330, Micromeritics, Norcross, Ga. The resulting density was 4.65 grams per cubic centimeter (g/cc).

The crushed particles were heat-treated at 1300° C. for 45 minutes in an electrically heated furnace (obtained from CM Furnaces, Bloomfield, N.J. under the trade designation "Rapid Temp Furnace"). The resulting crystalline particles retained their original crushed shape. The density of the particle was found to be 5.24 grams per cubic centimeter (g/cc). The crystallized glass ceramic phases, determined by XRD analysis as described in Examples 22, were composed of LaAlO$_3$, cubic/tetragonal ZrO$_2$, LaAl$_{11}$O$_{18}$, α-Al$_2$O$_3$, monoclinic ZrO$_2$ and minor amorphous phases.

Example 27–28

A 250-ml polyethylene bottle (7.3-cm diameter) was charged with 19.3 grams of alumina particles (obtained from Alcoa Industrial Chemicals, Bauxite, Ark., under the trade designation "Al6SG"), 9.5 grams of zirconium oxide particles (obtained from Zirconia Sales, Inc. of Marietta, Ga. under the trade designation "DK-2"), and 21.2 grams of lanthanum oxide particles (obtained from Molycorp Inc., Mountain Pass, Calif.), 75 grams of isopropyl alcohol, and 200 grams of alumina milling media (cylindrical shape, both height and diameter of 0.635 cm; 99.9% alumina; obtained from Coors, Golden, Colo.). The contents of the polyethylene bottle were milled for 16 hours at 60 revolutions per minute (rpm). After the milling, the milling media were removed and the slurry was poured onto a warm (approximately 75° C.) glass ("PYREX") pan, where it dried within 3 minutes. The dried mixture was screened through a 14-mesh screen (1400 micrometer opening size) with the aid of a paint brush and pre-sintered at 1400° C., in air, for two hours.

A hole (approximately 13 mm in diameter, about 8 cm deep) was bored at the end of a graphite rod (approximately 60 cm long, 15 mm in diameter). About 20 grams of pre-sintered particles were inserted into the hollow end. The hollow end of the graphite rod was inserted into the hot zone of a resistively heated furnace (obtained from Astro Industries, Santa Barbara, Calif.). The furnace was modified to convert it into a tube furnace with graphite tube with an inner diameter of approximately 18 mm. The hot zone was maintained at a temperature of 2000° C. and the furnace was tilted approximately 30° so that the melt would not spill out of the rod. The rod end was held in the hot zone for 10 minutes to ensure uniform melting. After the ten minutes, the rod was quickly removed from the furnace and tilted to pour the melt onto a quenching surface.

For Example 27, the quenching surface was two opposing stainless steel plates. The plates, 17.8 cm×5 cm×2.5 cm, were placed on their long edges parallel to each other with a gap of about 1 mm. The melt was poured into the gap where it rapidly solidified into a plate with a z dimension (thickness) of about 1 mm. The quenched melt was predominantly transparent and amorphous and exhibited a glass transition (T$_g$) of 885° C. and a crystallization temperature (T$_x$) of 930° C. as determine by a DTA trace obtained as described in Examples 1–20.

For Example 28, the quenching surface was two counter-rotating steel rollers. Rollers were 5 cm in diameter and driven by an electric motor at 80 rpm. The gap between the rollers was approximately 0.8 mm. The melt was poured into the gap where the rollers rapidly solidified into a plate with significant x and y dimensions and a z dimension (thickness) of 0.8 mm. The quenched melt was predominantly transparent and amorphous and exhibited a glass transition (T$_g$) of 885° C. and a crystallization temperature (T$_x$) of 930° C., as determine by a DTA trace obtained as described in Examples 1–20.

Example 29

The bulk amorphous/glass material produced in Example 21 was crushed by using a "Chipmunk" jaw crusher (Type VD, manufactured by BICO Inc., Burbank, Calif.) into abrasive particles and graded to retain the −30+35 mesh fraction (i.e., the fraction collected between 600-micrometer opening size and 500-micrometer opening size screens) and the −35+40 mesh fraction (i.e., the fraction collected between 500-micrometer opening size and 425-micrometer opening size screens). The two mesh fractions were combined to provide a 50/50 blend.

An aspect ratio measurement was taken using the method described in Example 26. The resulting aspect ratio was 1.83.

Density of the particles was taken using the method described in Example 26. The resulting density was 4.61 g/cc.

Examples 30–31

A hot-pressed disk was prepared as describe in Example 21 and was sectioned into 2 bars (approximately 2 cm×0.5 cm×0.5 cm) using a diamond saw (obtained from Buehler, Lake Bluff, Ill. under the trade designation "ISOMET 1000"). Both bars were annealed in an electrically heated furnace (obtained from CM Furnaces, Bloomfield, N.J. under the trade designation "Rapid Temp Furnace") at 800° C. for 2 hours. No crystallization occurred during the annealing process.

For Example 30, one bar was crushed with a hammer into particles of −30+35 mesh size (i.e., the fraction collected between 600-micrometer opening size and 500-micrometer opening size screens). The crushed particles were heat-treated at 1300° C. for 1 hour in an electrically heated furnace (obtained from CM Furnaces, Bloomfield, N.J. under the trade designation "Rapid Temp Furnace") to crystallize them. The particles were cleaned of debris by washing in a sonic bath (obtained from Cole-Parmer, Vernon Hills, Ill., under the trade designation "8891") for 15 minutes, dried at 100° C., and several were mounted on a metal cylinder (3 cm in diameter and 2 cm high) using carbon tape. The mounted sample was sputtered with a thin layer of gold-palladium and view using a JEOL SEM (Model JSM 840A).

Figure 7:
FIG. 7 is a Scanning Electron Micrograph (SEM) of fractured surface of material prepared in Example 30.
Figure 8:
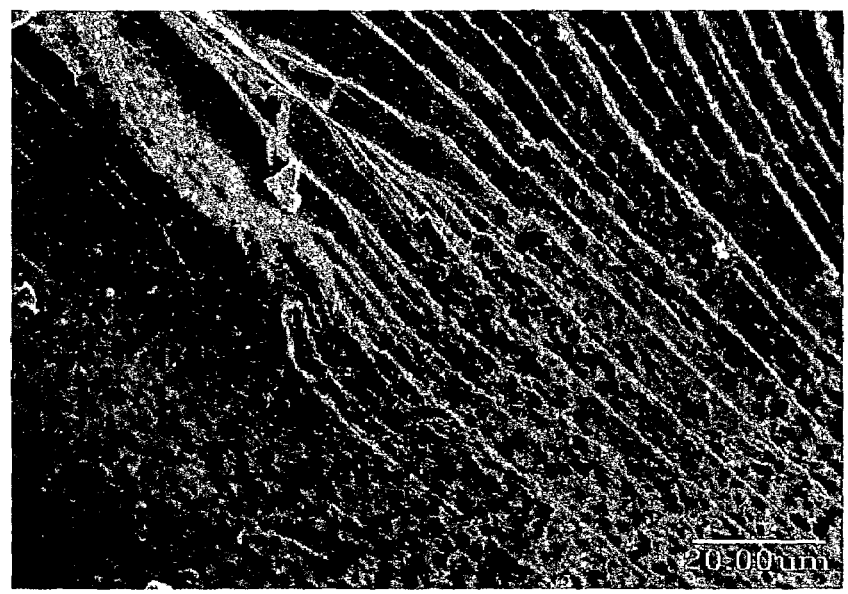
FIG. 8 is a Scanning Electron Micrograph (SEM) of fractured surface of material prepared in Example 30.

Classic glass fracture characteristics were noticeable in the material of Example 30, even after crystallization took place. The fracture surface shown in FIG. 7 is a good example of Wallner lines, common in most glass fracture. The fracture surface shown in FIG. 8 displays hackle, another common characteristic of glass fracture. The definitions of Wallner lines and hackle are taken as those given in the textbook, *Fundamentals of Inorganic Glasses,* Arun K Varshneya, p. 425–27, 1994.

The average hardness of the material of Example 30 was determined as follows. Several particles were mounted in mounting resin (obtained under the trade designation "TRANSOPTIC POWDER" from Buehler, Lake Bluff, Ill.). The resulting cylinder of resin was about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3 and 1-micrometer slurries. The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The microhardness were an average of 20 measurements. The average microhardness of the material of Example 30 was 16.4 GPa.

For Example 31, the second half of the bar was heat-treated at 1300° C. for 1 hour in an electrically heated furnace (obtained from CM Furnaces, Bloomfield, N.J. under the trade designation "Rapid Temp Furnace"). The heat-treated bar was crushed with a hammer into particles of −30+35 mesh size (i.e., the fraction collected between 600-micrometer opening size and 500-micrometer opening size screens). The particles were mounted and viewed using above described methods.

Figure 9:
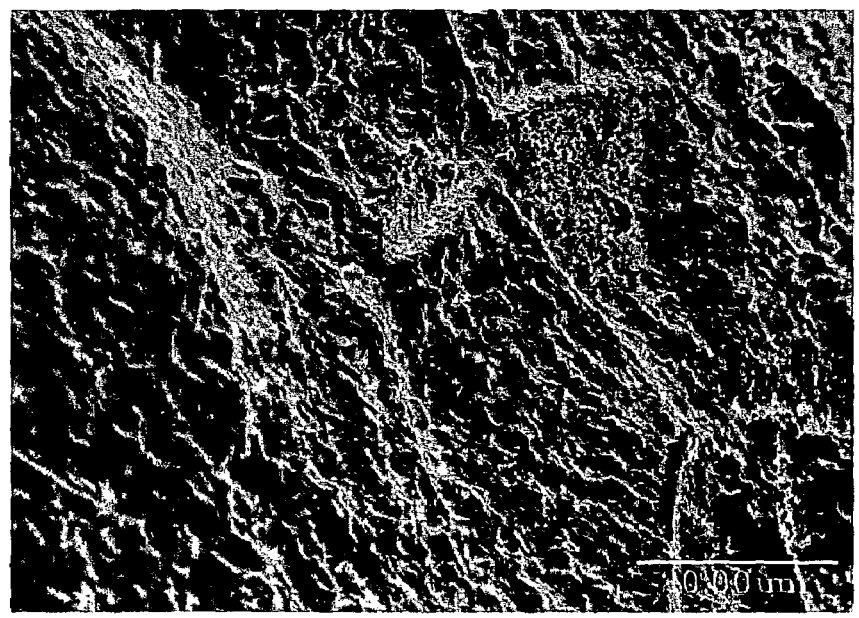
FIG. 9 is a Scanning Electron Micrograph (SEM) of fractured surface of material prepared in Example 31.

In contrast to the glass-fractured surface of the material of Example 30, the material of Example 31 exhibited fractured surfaces commonly seen in polycrystalline material. The fractured surface shown in FIG. 9 shows a rough surface with feature similar in size to the crystal size, typical of transgranular fracture.

Example 32

Figure 10:
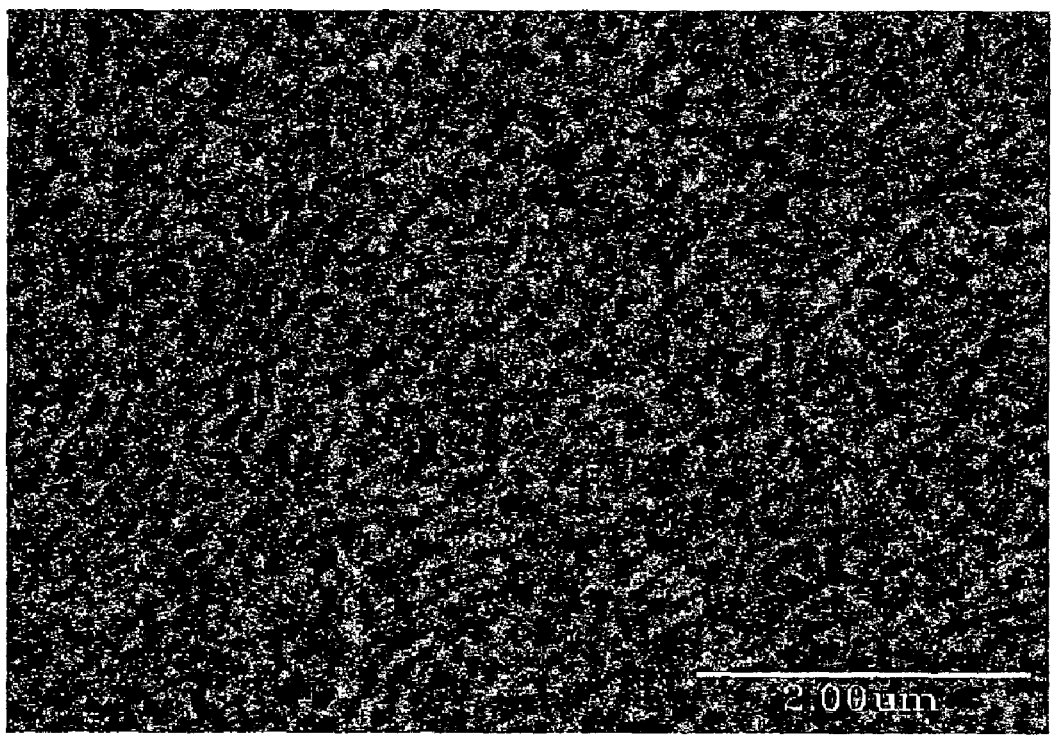
FIG. 10 is a back scattered electron micrograph of the material prepared in Example 32.

Beads from Example 4 were heat-treated at 1300° C. for 30 minutes in an electrically heated furnace. The crystallized beads were mounted and polished as described in Examples 30–31 and coated with a thin layer of gold-palladium and view using a JEOL SEM (Model JSM 840A). FIG. 10 is a typical back-scattered electron (BSE) micrograph of the microstructure found in crystallized beads. The crystallized sample was nanocrystalline with very narrow distribution of crystal size, with no crystals being larger than 200 nm visually observed from the micrograph.

The average crystal size was determined by the line intercept method according to the ASTM standard E 112-96 "Standard Test Methods for Determining Average Grain Size". The sample was mounted in mounting resin (obtained under the trade designation "TRANSOPTIC POWDER" from Buehler, Lake Bluff, Ill.). The resulting cylinder of resin was about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries. The mounted and polished sample was coated with a thin layer of gold-palladium and view using a JEOL SEM (Model JSM 840A). A typical back-scattered electron (BSE) micrograph of the microstructure found in the sample was used to determine the average crystal size as follows. The number of crystals that intersected per unit length ($N_L$) of a random line were drawn across the micrograph was counted. The average crystal size is determined from this number using the following equation.

$$\text{Average Crystal Size} = \frac{1.5}{N_L M}$$

Where $N_L$ is the number of crystals intersected per unit length and M is the magnification of the micrograph. The average crystal size in the sample was 140 nm, as measured by line-intercept method.

Example 33

The consolidated material produced in Example 21 was heat treated at 1300° C. for 45 minutes in an electrically heated furnace (obtained from CM Furnaces, Bloomfield, N.J. under the trade designation "Rapid Temp Furnace"). The resulting crystalline material was crushed by using a "Chipmunk" jaw crusher (Type VD, manufactured by BICO Inc., Burbank, Calif.) into abrasive particles and graded to retain the −30+35 fraction (i.e., the fraction collected between 600-micrometer opening size and 500-micromter opening size screens) and the −35+40 mesh fraction (i.e., the fraction collected 500-micrometer opening size and 5425-micrometer opening size screens). The two mesh fractions were combined to provide a 50/50 blend.

An aspect ratio measurement was taken using the method of Example 26. The resulting aspect ratio was 1.84.

Density of the particles was taken using the method of Example 26. The resulting density was 5.19 g/cc.

Example 34

About 150 grams of the beads prepared as described in Example 1 were placed in a 5 centimeter (cm)×5 cm×5 cm steel can, which was then evacuated and sealed from the atmosphere. The steel can was subsequently hot-isostatically pressed (HIPed) using a HIP apparatus (obtained under the trade designation "IPS Eagle-6", American Isostatic Pressing, Ohio). The HIPing was carried out at 207 MPa (30 ksi) pressure in an argon atmosphere. The HIPing furnace was ramped up to 970° C. at 25° C./minute and held at that temperature for 30 minutes. After the HIPing, the steel can was cut and the charge material removed. It was observed that beads coalesced into a chunk of transparent, glassy material. The DTA trace, conducted as described in Examples 1-20, exhibited a glass transition ($T_g$) of 879° C. and a crystallization temperature ($T_x$) of 931° C.

Example 35

A polyurethane-lined mill was charged with 819.6 grams of alumina particles ("APA-0.5"), 818 grams of lanthanum oxide particles (obtained from Molycorp, Inc.), 362.4 grams of yttria-stabilized zirconium oxide particles (with a nominal composition of 94.6 wt-% $ZrO_2$ (+$HfO_2$) and 5.4 wt-% $Y_2O_3$; obtained under the trade designation "HSY-3" from Zirconia Sales, Inc. of Marietta, Ga.), 1050 grams of distilled water and about 2000 grams of zirconia milling media (obtained from Tosoh Ceramics, Division of Bound Brook, N.J., under the trade designation "YTZ"). The mixture was milled at 120 revolutions per minute (rpm) for 4 hours to thoroughly mix the ingredients. After the milling, the milling media were removed and the slurry was poured onto a glass ("PYREX") pan where it was dried using a heat-gun. The dried mixture was ground with a mortar and pestle and screened through a 70-mesh screen (212-micrometer opening size). After grinding and screening, some of the particles were fed into a hydrogen/oxygen torch flame as described in Example 22.

Figure 11:
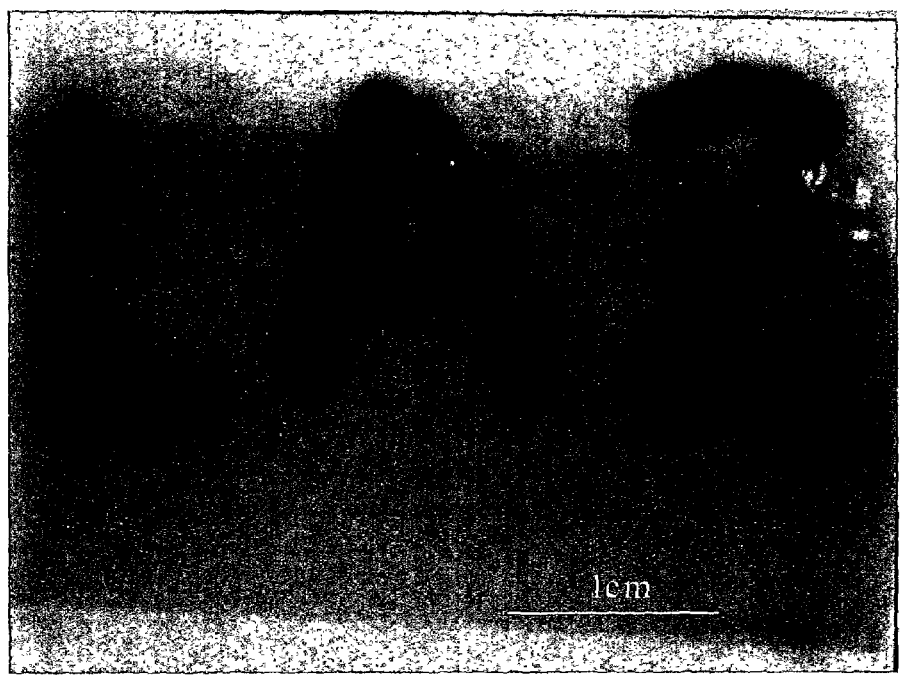
FIG. 11 is an optical photomicrograph of a sectioned bar (2-mm thick) of the hot-pressed material demonstrating its transparency.

About 50 grams of the beads was placed in a graphite die and hot-pressed using a uniaxial pressing apparatus (obtained under the trade designation "HP-50", Thermal Technology Inc., Brea, Calif.). The hot-pressing was carried out at 960° C. in an argon atmosphere and 13.8 megapascals (MPa) (2000 pounds per square inch (2 ksi)) pressure. The resulting translucent disk was about 48 millimeters in diameter, and about 5 mm thick. Additional hot-press runs were performed to make additional disks. FIG. 11 an optical photomicrograph of a sectioned bar (2-mm thick) of the hot-pressed material demonstrating its transparency.

The density of the resulting hot-pressed glass material was measured using Archimedes method, and found to be within a range of about 4.1–4.4 g/cm³. The Youngs' modulus (E) of the resulting hot-pressed glass material was measured using a ultrasonic test system (obtained from Nortek, Richland, Wash. under the trade designation "NDT-140"), and found to be within a range of about 130–150 GPa.

The average microhardnesses of the resulting hot-pressed material was determined as follows. Pieces of the hot-pressed material (about 2–5 millimiters in size) were mounted in mounting resin (obtained under the trade designation "EPOMET" from Buehler Ltd., Lake Bluff, Ill.). The resulting cylinder of resin was about 2.5 cm (1 inch) in diameter and about 1.9 cm (0.75 inch) tall (i.e., high). The mounted samples were polished using a conventional grinder/polisher (obtained under the trade designation "EPOMET" from Buehler Ltd.) and conventional diamond slurries with the final polishing step using a 1-micrometer diamond slurry (obtained under the trade designation "METADI" from Buehler Ltd.) to obtain polished cross-sections of the sample.

The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The microhardness values were an average of 20 measurements. The average microhardness of the hot-pressed material was about 8.3 GPa.

The average indentation toughness of the hot-pressed material was calculated by measuring the crack lengths extending from the apices of the vickers indents made using a 500 gram load with a microhardness tester (obtained under the trade designation "MITUTOYO MVK-VL" from Mitutoyo Corporation, Tokyo, Japan). Indentation toughness ($K_{IC}$) was calculated according to the equation:

$$K_{IC} = 0.016 (E/H)^{1/2} (P/c)^{3/2}$$

wherein:
E=Young's Modulus of the material;
H=Vickers hardness;
P=Newtons of force on the indenter;
c=Length of the crack from the center of the indent to its end.

Samples for the toughness were prepared as described above for the microhardness test. The reported indentation toughness values are an average of 5 measurements. Crack (c) were measured with a digital caliper on photomicrographs taken using a scanning electron microscope ("JEOL SEM" (Model JSM 6400)). The average indentation toughness of the hot-pressed material was 1.4 MPa·m$^{1/2}$.

The thermal expansion coefficient of the hot-pressed material was measured using a thermal analyser (obtained from Perkin Elmer, Shelton, Conn., under the trade designation "PERKIN ELMER THERMAL ANALYSER"). The average thermal expansion coefficient was 7.6×10$^{-6}$/° C.

The thermal conductivity of the hot-pressed material was measured according to an ASTM standard "D 5470-95, Test Method A" (1995), the disclosure of which is incorporated herein by reference. The average thermal conductivity was 1.15 W/m*K.

The translucent disk of hot-pressed $La_2O_3$-$Al_2O_3$-$ZrO_2$ glass was heat-treated in a furnace (an electrically heated furnace (obtained under the trade designation "Model KKSK-666-3100" from Keith Furnaces of Pico Rivera, Calif.)) as follows. The disk was first heated from room temperature (about 25° C.) to about 900° C. at a rate of about 10° C./min and then held at 900° C. for about 1 hour. Next, the disk was heated from about 900° C. to about 1300° C. at a rate of about 10° C./min and then held at 1300° C. for about 1 hour, before cooling back to room temperature by turning off the furnace. Additional runs were performed with the same heat-treatment schedule to make additional disks.

Figure 12:
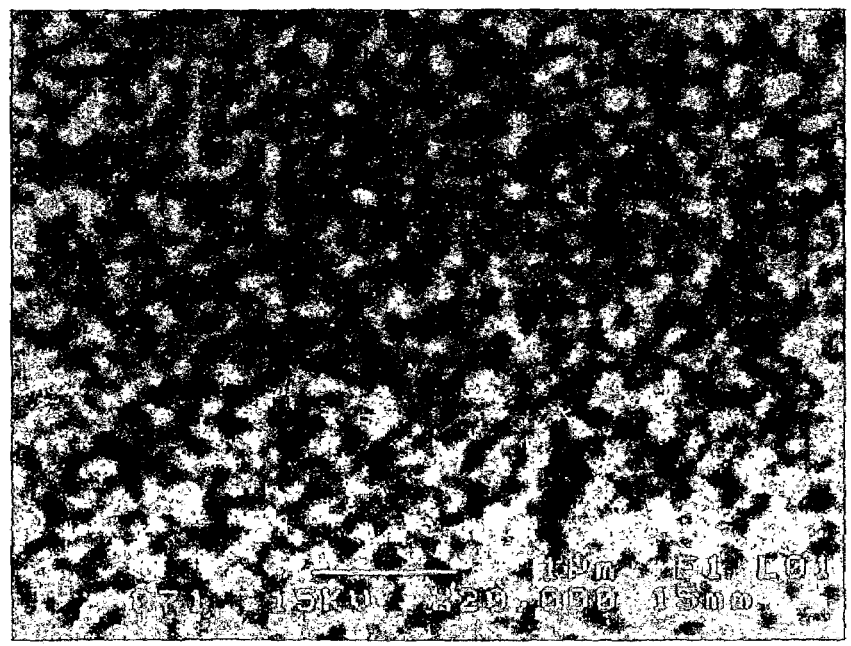
FIG. 12 is a scanning electron microscope (SEM) photomicrograph of a polished section of heat-treated Example 35 material.

FIG. 12 is a scanning electron microscope (SEM) photomicrograph of a polished section of heat-treated Example 35 material showing the fine crystalline nature of the material. The polished section was prepared using conventional mounting and polishing techniques. Polishing was done using a polisher (obtained from Buehler of Lake Bluff, Ill. under the trade designation "ECOMET 3 TYPE POLISHER-GRINDER"). The sample was polished for about 3 minutes with a diamond wheel, followed by three minutes of polishing with each of 45, 30, 15, 9, and 3-micrometer diamond slurries. The polished sample was coated with a thin layer of gold-palladium and viewed using JEOL SEM (Model JSM 840A).

Based on powder X-ray diffraction as described in Example 22 of a portion of heat-treated Example 35 material and examination of the polished sample using SEM in the backscattered mode, it is believed that the dark portions in the photomicrograph were crystalline $LaAl_{11}O_{18}$ the gray portions crystalline $LaAlO_3$, and the white portions crystalline cubic/tetragonal $ZrO_2$.

The density of the heat-treated material (glass-ceramic) was measured using Archimedes method, and found to be about 5.18 g/cm$^3$. The Youngs' modulus (E) of the heat-treated material was measured using an ultrasonic test system (obtained from Nortek, Richland, Wash. under the trade designation "NDT-140"), and found to be about 260 GPa. The average microhardness of the heat-treated material was determined as described above for the Example 35 glass beads, and was found to be 18.3 GPa. The average fracture toughness ($K_{Ic}$) of the heat-treated material was determined as described above for the Example 35 hot-pressed material, and was found to be 3.3 MPa·m$^{1/2}$.

Example 36

Example 36 material was prepared in the same manner as in Example 35 with the following exceptions: the raw materials were 240 grams of lanthana (obtained from Molycorp, Inc.), and 260 grams alumina ("APA-0.5") resulting in a composition containing 48% by weight lanthana and 52% by weight alumina; the glassy material of Example 36 (with a $T_g$, of 840° C. and $T_x$, of 925° C.); the average hardness of the Example 36 material was 16.0±0.4 GPa.

Grinding Performance of Examples 35, 35A, 36 and Comparative Examples A–C

Example 35 and 36 hot-pressed material was crushed by using a "Chipmunk" jaw crusher (Type VD, manufactured by BICO Inc., Burbank, Calif.) into (abrasive) particles and graded to retain the −25+30 mesh fraction (i.e., the fraction collected between 25-micrometer opening and 30-micrometer opening size sieves) and −30+35 mesh fractions (i.e., the fraction collected between 30-micrometer opening size and 35-micrometer opening size sieves) (USA Standard Testing Sieves). These two mesh fractions were combined to provide a 50/50 blend. The blended material was heat treated as described in Example 35. Thirty grams of the resulting glass-ceramic abrasive particles were incorporated into a coated abrasive disc. The coated abrasive disc was made according to conventional procedures. The glass-ceramic abrasive particles were bonded to 17.8 cm diameter, 0.8 mm thick vulcanized fiber backings (having a 2.2 cm diameter center hole) using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether). The wet make resin weight was about 185 g/m². Immediately after the make coat was applied, the glass-ceramic abrasive particles were electrostatically coated. The make resin was precured for 120 minutes at 88° C. Then the cryolite-filled phenolic size coat was coated over the make coat and abrasive particles. The wet size weight was about 850 g/m². The size resin was cured for 12 hours at 99° C. The coated abrasive disc was flexed prior to testing.

Example 35A coated abrasive disk was prepared as described for Example 35 except the Example 35A abrasive particles were obtained by crushing a hot-pressed and heat-treated Example 35 material, rather than crushing then heat-treating.

Comparative Example A coated abrasive disks were prepared as described for Example 35 (above), except heat-treated fused alumina abrasive particles (obtained under the trade designation "ALODUR BFRPL'" from Triebacher, Villach, Austria) was used in place of the Example 35 glass-ceramic abrasive particles.

Comparative Example B coated abrasive discs were prepared as described for Example 35 (above), except alumina-zirconia abrasive particles (having a eutectic composition of 53% $Al_2O_3$ and 47% $ZrO_2$; obtained under the trade designation "NORZON" from Norton Company, Worcester, Mass.) were used in place of the Example 34 glass-ceramic abrasive particles.

Comparative Example C coated abrasive discs were prepared as described above except sol-gel-derived abrasive particles (marketed under the trade designation "321 CUBITRON" from the 3M Company, St. Paul, Minn.) was used in place of the Example 35 glass-ceramic abrasive particles.

The grinding performance of Example 35, 35A, 36 and Comparative Examples A–C coated abrasive discs were evaluated as follows. Each coated abrasive disc was mounted on a beveled aluminum back-up pad, and used to grind the face of a pre-weighed 1.25 cm×18 cm×10 cm 1018 mild steel workpiece. The disc was driven at 5,000 rpm while the portion of the disc overlaying the beveled edge of the back-up pad contacted the workpiece at a load of 8.6 kilograms. Each disc was used to grind an individual workpiece in sequence for one-minute intervals. The total cut was the sum of the amount of material removed from the workpieces throughout the test period. The total cut by each sample after 12 minutes of grinding as well as the cut at the 12th minute (i.e., the final cut) are reported in Table 3, below. The Example 35 and 36 results are an average of two discs, where as one disk was tested for each of Example 35A, and Comparative Examples A, B, and C.

TABLE 3

| Example | Total cut, g | Final cut, g |
|---|---|---|
| 35 | 1163 | 92 |
| 35A | 1197 | 92 |
| 36 | 1094 | 91 |
| Comp. A | 514 | 28 |
| Comp. B | 689 | 53 |
| Comp. C | 1067 | 89 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A plurality of abrasive particles having a specified nominal grade, wherein at least a portion of the plurality of abrasive particles comprise a glass-ceramic, the glass-ceramic comprising alpha alumina having an average crystal size not greater than 150 nanometers, wherein the abrasive particles of the portion have a density of at least 90 percent of theoretical density.

2. The plurality of abrasive particles according to claim 1 wherein at least 75 percent by number of the alpha alumina crystals are no greater than 150 nanometers.

3. The plurality of abrasive particles according to claim 1 wherein at least 25 percent by weight of the abrasive particles are the abrasive particles comprising the alpha alumina having the average crystal size of not greater than 150 nanometers, based on the total weight of the plurality of abrasive particles.

4. The plurality of abrasive particles according to claim 1 wherein the specified nominal grade is selected from the group consisting of ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

5. The plurality of abrasive particles according to claim 1 wherein the specified nominal grade is selected from the group consisting of P8, P12, P16, P24, P36, P40, P50, P60, P80, P100, P120, P150, P180, P220, P320, P400, P500, P600, P800, P1000, and P1200.

6. The plurality of abrasive particles according to claim 1 wherein the specified nominal grade is selected from the group consisting of JIS8, JIS 12, JIS 16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10, 000.

7. An abrasive article comprising a binder and a plurality of abrasive particles, wherein at least a portion of the abrasive particles comprise a glass-ceramic, the glass-ceramic comprising alpha alumina having an average crystal size not greater than 150 nanometers, wherein the abrasive particles of the portion have a density of at least 90 percent of theoretical density.

8. The abrasive article according to claim 7 wherein the abrasive article is a bonded abrasive article, a non-woven abrasive article, or a coated abrasive article.

9. The abrasive article according to claim 7 wherein at least 75 percent by number of the alpha alumina crystals are no greater than 150 nanometers.

10. A method of abrading a surface, the method comprising:
providing an abrasive article comprising a binder and a plurality of abrasive particles, wherein at least a portion of the abrasive particles comprise a glass-ceramic, the glass-ceramic comprising alpha alumina having an average crystal size not greater than 150 nanometers, wherein the abrasive particles of the portion have a density of at least 90 percent of theoretical density;
contacting at least one of the abrasive particles comprising the alpha alumina with a surface of a workpiece; and
moving at least one of the contacted abrasive particles comprising the alpha alumina or the contacted surface to abrade at least a portion of the surface with the contacted abrasive particle comprising the alpha alumina.

11. A plurality of abrasive particles having a specified nominal grade, wherein at least a portion of the plurality of abrasive particles comprise a glass-ceramic, the glass-ceramic comprising alpha alumina, wherein at least 90 percent by number of the alpha alumina present in such portion have crystal sizes not greater than 200 nanometers, and wherein the abrasive particles of the portion have a density of at least 90 percent of theoretical density.

12. The plurality of abrasive particles according to claim 11 wherein at least a portion of the plurality of abrasive particles comprise alpha alumina having an average crystal size of greater than 200 nanometers.

13. The plurality of abrasive particles according to claim 11 wherein at least 95 percent by number of the alpha alumina present in such portion has an average crystal size of not greater than 200 nanometers.

14. The plurality of abrasive particles according to claim 11 wherein the specified nominal grade is selected from the group consisting of ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

15. The plurality of abrasive particles according to claim 11 wherein the specified nominal grade is selected from the group consisting of P8, P12, P16, P24, P36, P40, P50, P60, P80, P100, P120, P150, P180, P220, P320, P400, P500, P600, P800, P1000, and P1200.

16. The plurality of abrasive particles according to claim 11 wherein the specified nominal grade is selected from the group consisting of JIS8, JIS 12, JIS 16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

17. An abrasive article comprising a binder and a plurality of abrasive particles, wherein at least a portion of the abrasive particles comprise a glass-ceramic, the glass-ceramic comprising alpha alumina, wherein at least 90 percent by number of the alpha alumina present in such portion have crystal sizes not greater than 200 nanometers, and wherein the abrasive particles of the portion have a density of at least 90 percent of theoretical density.

18. The abrasive article according to claim 17 wherein the abrasive article is a bonded abrasive article, a non-woven abrasive article, or a coated abrasive article.

19. The abrasive article according to claim 17 wherein the alpha alumina has an average crystal size of not greater than 150 nanometers.

20. A method of abrading a surface, the method comprising:
providing an abrasive article comprising a binder and a plurality of abrasive particles, wherein at least a portion of the abrasive particles comprise glass-ceramic, the glass ceramic comprising alpha alumina and wherein at least 90 percent by number of the alpha alumina present in such portion have crystal sizes not greater than 200 nanometers, and wherein the abrasive particles of the portion have a density of at least 90 percent of theoretical density;
contacting at least one of the abrasive particles comprising the alpha alumina with a surface of a workpiece; and
moving at least one of the contacted abrasive particles comprising the alpha alumina or the contacted surface to abrade at least a portion of the surface with the contacted abrasive particle comprising the alpha alumina.

21. A plurality of abrasive particles having a specified nominal grade, wherein at least a portion of the plurality of abrasive particles comprise a glass-ceramic, the glass-ceramic comprising at least 35 percent by weight $Al_2O_3$, based on the total weight of the glass-ceramic of each particle of the portion, and a metal oxide other than $Al_2O_3$, wherein at least a portion of the $Al_2O_3$, is crystalline, wherein any crystalline phase present in the glass-ceramic comprising $Al_2O_3$, has an average crystal size not greater than 150 nanometers, and wherein the abrasive particles of the portion have a density of at least 90 percent of theoretical density.

22. An abrasive article comprising a binder and a plurality of abrasive particles, wherein at least a portion of the abrasive particles comprise a glass-ceramic, the glass-ceramic comprising at least 35 percent by weight $Al_2O_3$, based on the total weight of the glass-ceramic of each particle of the portion, and a metal oxide other than $Al_2O_3$, wherein at least a portion of the $Al_2O_3$ is crystalline, wherein any crystalline phase present in the glass-ceramic comprising $Al_2O_3$ has an average crystal size not greater than 150 nanometers, and wherein the abrasive particles of the portion have a density of at least 90 percent of theoretical density.

23. A method of abrading a surface, the method comprising:
providing an abrasive article comprising a binder and a plurality of abrasive particles, wherein at least a portion of the abrasive particles comprise a glass-ceramic, the glass-ceramic comprising at least 35 percent by weight $Al_2O_3$, based on the total weight of the glass-ceramic of each particle of the portion, and a metal oxide other than $Al_2O_3$, wherein at least a portion of the $Al_2O_3$ is crystalline, wherein any crystalline phase present in the glass-ceramic comprising $Al_2O_3$ has an average crystal size not greater than 150 nanometers, and wherein the abrasive particles of the portion have a density of at least 90 percent of theoretical density;
contacting at least one of the abrasive particles comprising the alpha glass-ceramic with a surface of a workpiece; and
moving at least one of the contacted abrasive particles comprising the glass-ceramic or the contacted surface to abrade at least a portion of the surface with the contacted abrasive particle comprising the glass-ceramic.

24. A plurality of abrasive particles having a specified nominal grade, wherein at least a portion of the plurality of abrasive particles comprise a glass-ceramic, the glass-ceramic comprising at least 35 percent by weight $Al_2O_3$, based on the total weight of the glass-ceramic of each particle of the portion, and a metal oxide other than $Al_2O_3$, wherein at least a portion of the $Al_2O_3$ is crystalline, wherein at least 90 percent by number of any crystalline phase present in the glass-ceramic comprising $Al_2O_3$ have crystal sizes not greater than 200 nanometers, and wherein the abrasive particles of the portion have a density of at least 90 percent of theoretical density.

25. An abrasive article comprising a binder and a plurality of abrasive particles, wherein at least a portion of the abrasive particles comprise a glass-ceramic, the glass-ceramic comprising at least 35 percent by weight $Al_2O_3$, based on the total weight of the glass-ceramic of each particle of the portion, and a metal oxide other than $Al_2O_3$, wherein at least a portion of the $Al_2O_3$ is crystalline, wherein at least 90 percent by number of any crystalline phase present in the glass-ceramic comprising $Al_2O_3$ have crystal sizes not greater than 200 nanometers, and wherein the abrasive particles of the portion have a density of at least 90 percent of theoretical density.

26. A method of abrading a surface, the method comprising:

providing an abrasive article comprising a binder and a plurality of abrasive particles, wherein at least a portion of the abrasive particles comprise a glass-ceramic, the glass-ceramic comprising at least 35 percent by weight $Al_2O_3$, based on the total weight of the glass-ceramic of each particle of the portion, and a metal oxide other than $Al_2O_3$, wherein at least a portion of the $Al_2O_3$ is crystalline, wherein at least 90 percent by number of any crystalline phase present in the glass-ceramic comprising $Al_2O_3$ have crystal sizes not greater than 200 nanometers, and wherein the abrasive particles of the portion have a density of at least 90 percent of theoretical density;

contacting at least one of the abrasive particles comprising the glass-ceramic with a surface of a workpiece; and moving at least one of the contacted abrasive particles comprising the glass-ceramic or the contacted surface to abrade at least a portion of the surface with the contacted abrasive particle comprising the glass-ceramic.

* * * * *

UNITED STATES PATENT AND TRADEMARK OFFICE
CERTIFICATE OF CORRECTION

PATENT NO. : 7,501,000 B2
APPLICATION NO. : 10/211598
DATED : March 10, 2009
INVENTOR(S) : Anatoly Z. Rosenflanz It is certified that error appears in the above-identified patent and that said Letters Patent is hereby corrected as shown below:

Title Page 4 Col. 1 (Foreign Patents Documents) – Line 37 - Below "RU 2148569 5/2000" delete "RU 2148569 10/2000". (Repeated Entry.)

Title Page 4 Col. 2 (Other Publications) – Line 42 - Delete "10/739,44." and insert -- 10/739,440. --, therefor.

Title Page 4 Col. 2 (Other Publications) – Line 65 - Delete "fundamentsal" and insert -- fundamentals --, therefor.

Title Page 6 Col. 2 (Other Publications) – Line 26 - Delete "Marerials," and insert -- Materials, --, therefor.

Title Page 7 Col. 1 (Other Publications) – Line 23 - Delete "Glassed" and insert -- Glasses --, therefor.

Title Page 7 Col. 1 (Other Publications) – Line 28 - Delete "America" and insert -- American --, therefor.

Column 11 – Line 35 - After "size" insert -- range --.

Column 21 – Line 21 (Approx.) - Delete "fit" and insert -- frit --, therefor.

Column 21 – Line 23 (Approx.) - Delete "fit" and insert -- frit --, therefor.

Column 22 – Line 8 - Delete "tetrachloronaphtalene," and insert -- tetrachloronaphthalene, --, therefor.

Column 22 – Line 11 - Delete "tetrafluoroboate," and insert -- tetrafluoroborate, --, therefor.

Column 26 – Line 34 - Delete "$AL_2O_3$" and insert -- $Al_2O_3$ --, therefor.

Column 27 (Table 1 Continued) – Line 32 - Delete "$La_2O_3$ 21.4" and insert -- $La_2O_3$: 21.4 --, therefor.

Column 27 (Table 1 Continued) – Line 32 - Delete "$La_2O_3$ 42.8" and insert -- $La_2O_3$: 42.8 --, therefor.

UNITED STATES PATENT AND TRADEMARK OFFICE
CERTIFICATE OF CORRECTION

PATENT NO. : 7,501,000 B2
APPLICATION NO. : 10/211598
DATED : March 10, 2009
INVENTOR(S) : Anatoly Z. Rosenflanz It is certified that error appears in the above-identified patent and that said Letters Patent is hereby corrected as shown below:

Column 27 (Table 1 Continued) – Line 38 - Delete "ZrO2: 14.8" and insert -- $ZrO_2$: 14.8 --, therefor.

Column 27 (Table 1 Continued) – Line 39 - Delete "CaF2: 20" and insert -- $CaF_2$: 20 --, therefor.

Column 31 – Line 46 - Delete "PHLLIPS" and insert -- PHILLIPS --, therefor.

Column 32 – Line 15-16 - Delete "Poulence," and insert -- Poulenc, --, therefor.

Column 33 – Line 39 - Delete "$Y_{0.15}Zr_{0.85}O_{1\ 93}$." and insert -- $Y_{0.15}Zr_{0.85}O_{1.93}$. --, therefor.

Column 38 – Line 4 - Delete "micromter" and insert -- micrometer --, therefor.

Column 39 – Line 5 - Delete "millimiters" and insert -- millimeters --, therefor.

Column 39 – Line 49 (Approx.) - Delete "$MPa\text{-}m^{1/2}$." and insert -- $MPa \cdot m^{1/2}$. --, therefor.

Column 44 – Line 5 - In Claim 21, after "$Al_2O_3$" delete ",".

Column 44 – Line 6 - In Claim 21, after "$Al_2O_3$" delete ",".

Signed and Sealed this

Third Day of November, 2009

David J. Kappos
*Director of the United States Patent and Trademark Office*